(12) United States Patent
Kotake et al.

(10) Patent No.: US 7,782,361 B2
(45) Date of Patent: Aug. 24, 2010

(54) METHOD AND APPARATUS FOR MEASURING POSITION AND ORIENTATION

(75) Inventors: Daisuke Kotake, Yokohama (JP); Kiyohide Satoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 676 days.

(21) Appl. No.: 11/398,350

(22) Filed: Apr. 5, 2006

(65) Prior Publication Data

US 2006/0227211 A1 Oct. 12, 2006

(30) Foreign Application Priority Data

Apr. 6, 2005 (JP) .............................. 2005-109834

(51) Int. Cl.
| | |
|---|---|
| H04N 5/225 | (2006.01) |
| H04N 7/18 | (2006.01) |
| H04N 5/228 | (2006.01) |
| H04N 5/232 | (2006.01) |
| G01C 17/38 | (2006.01) |
| G01C 9/00 | (2006.01) |
| G06K 9/00 | (2006.01) |
| G06K 9/36 | (2006.01) |

(52) U.S. Cl. .................. 348/207.99; 348/141; 348/142; 348/143; 348/169; 348/208.2; 348/208.4; 348/208.14; 348/211.4; 348/211.14; 702/94; 702/95; 702/150; 702/151; 382/103; 382/289; 382/291

(58) Field of Classification Search ......... 348/141–142, 348/169–172, 208.2–208.4, 207.99, 211.14; 382/289–291, 154, 103; 702/92–95, 150–151; 356/139, 139.02–139.06, 139.1, 143–148

See application file for complete search history.

(56) References Cited

U.S. PATENT DOCUMENTS

| | | | | |
|---|---|---|---|---|
| 6,137,491 | A   * | 10/2000 | Szeliski ....................... 345/419 |
| 7,437,244 | B2 * | 10/2008 | Okada ......................... 701/301 |
| 2002/0052709 | A1* | 5/2002 | Akatsuka et al. ............. 702/153 |
| 2002/0103617 | A1* | 8/2002 | Uchiyama et al. ........... 702/150 |
| 2003/0063292 | A1* | 4/2003 | Mostafavi ................... 356/614 |

(Continued)

OTHER PUBLICATIONS

Kato, et al, "Augmented reality system on the basis of marker tracking and calibration therefor", Journal of the Virtual Reality Society of JP, vol. 4, No. 4, pp. 607-616(1999).

(Continued)

*Primary Examiner*—Jason Chan
*Assistant Examiner*—Michael Osinski
(74) *Attorney, Agent, or Firm*—Canon U.S.A., Inc. I.P. Division

(57) ABSTRACT

A position and an orientation of an image capturing device or an object to which an inclination sensor is mounted are obtained without performing iterative calculation. A position and orientation measuring method includes the steps of: inputting a measured inclination value of an inclination sensor mounted to one of an object and an image capturing device; inputting a captured image from the image capturing device; detecting an index on the object from the captured image; and calculating a position and an orientation of one of the object and the image capturing device to which the inclination sensor is mounted on the basis of the measured inclination value, an image coordinate of the detected index, and already-known positional information on the detected index without performing iterative calculation.

14 Claims, 6 Drawing Sheets

U.S. PATENT DOCUMENTS

| | | | |
|---|---|---|---|
| 2003/0144813 A1* | 7/2003 | Takemoto et al. | 702/153 |
| 2004/0090444 A1 | 5/2004 | Satoh | |
| 2005/0008256 A1* | 1/2005 | Uchiyama et al. | 382/291 |
| 2005/0069174 A1* | 3/2005 | Uchiyama et al. | 382/103 |
| 2005/0069196 A1* | 3/2005 | Uchiyama et al. | 382/154 |
| 2005/0159916 A1* | 7/2005 | Anabuki | 702/151 |
| 2005/0253870 A1* | 11/2005 | Kotake et al. | 345/633 |
| 2005/0261573 A1* | 11/2005 | Satoh et al. | 600/415 |
| 2006/0071946 A1* | 4/2006 | Anabuki et al. | 345/633 |
| 2006/0094955 A1* | 5/2006 | Satoh et al. | 600/426 |

OTHER PUBLICATIONS

Satoh, et al, "A head tracking method using bird's-eye view camera and gyroscope," Proc. 3rd IEEE/ACM Int'l Symp. on Mixed and Augmented Reality (ISMAR 2004), pp. 202-211, 2004.

* cited by examiner

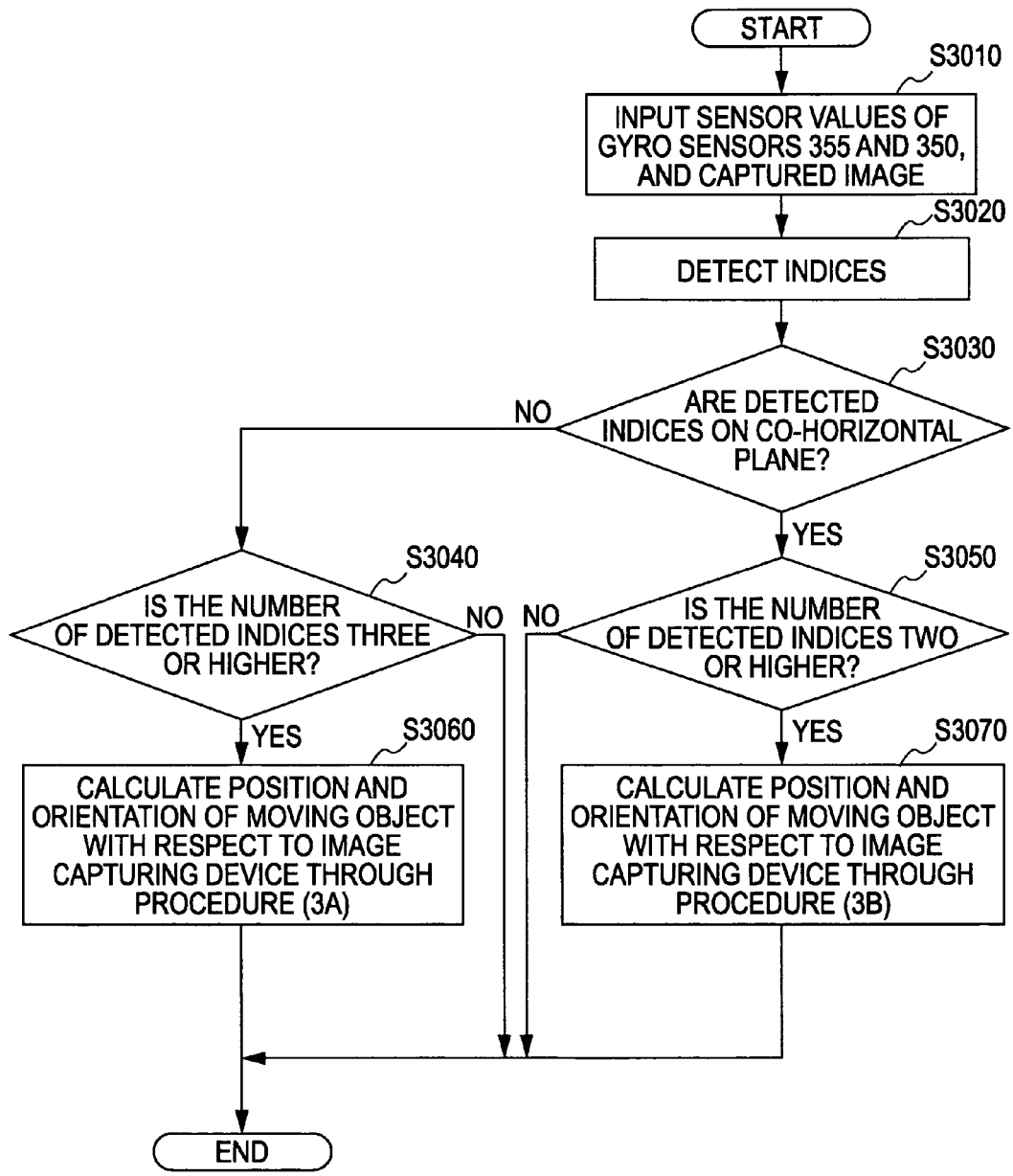

METHOD AND APPARATUS FOR MEASURING POSITION AND ORIENTATION

BACKGROUND OF THE INVENTION

1. Field of the Invention

The present invention relates to a technology for directly measuring a position and an orientation of an image capturing device or an object on the basis of a measured value of an inclination sensor.

2. Description of the Related Art

In recent years, research on mixed reality (MR) technologies has been progressing. MR technologies refer to technologies for seamlessly integrating a physical space with a virtual space generated by a computer. Among MR technologies, an augmented reality (AR) technology for superimposing a virtual space on a physical space is attracting particular attention.

An image display device using AR technology is realized by a video see-through method or an optical see-through method. According to the video see-through method, a synthetic image is displayed which is formed by superimposing, on an image of a physical space captured by an image capturing device such as a video camera, an image of a virtual space (such as a virtual object drawn by computer graphics or text information) which is generated on the basis of a position or an orientation of the image capturing device. Meanwhile, according to the optical see-through method, the image of a virtual space generated on the basis of a position of a viewer's eye and an orientation of the viewer's head is displayed on an optical see-through display mounted to the head of the viewer.

Applications of AR technology are now anticipated in various fields such as surgery assistance for superimposing and displaying a condition of a patient's internal body on the body surface, architectural simulation for superimposing and displaying a virtual building on an empty construction site, and assembly assistance for superimposing and displaying an operational flow during the assembly work.

One of the most important issues in AR technology is how to perform accurate registration between the physical space and the virtual space, and up to now a large number of approaches have taken place. In the case of using the video see-through method, a problem of the registration in AR technology is in essence a problem of obtaining a position and an orientation of the image capturing device in the scene (more specifically, in the world coordinate system defined in the scene). Similarly, in the case of using the optical see-through method, the problem of the registration in AR technology leads to a problem of obtaining the position of the viewer's eye and the orientation of the viewer's head or the position and the orientation of the display in the scene.

As a method of solving the former problem, a plurality of indices are arranged or set in the scene, and the indices' projected positions on an image captured by the image capturing device are detected, whereby the position and the orientation of the image capturing device in the scene are obtained. As a method of solving the latter problem, the image capturing device is mounted to a measurement target (that is, the head of the viewer or the display), the position and the orientation of the image capturing device are obtained in the similar manner to the former method, and then a position and an orientation of the measurement target are obtained on the basis of the position and the orientation of the image capturing device.

Methods of obtaining the position and the orientation of the image capturing device on the basis of the correspondence between the projected positions of the indices on the captured image and the three-dimensional positions of the indices have been proposed in the field of photogrammetry for many years. In addition, the paper by Kato, M. Billinghurst, Asano, and Tachibana: "An Augmented Reality System and its Calibration based on Marker Tracking", Journal of The Virtual Reality Society of Japan, Vol. 4, No. 4, pp. 607-616, (December 1999) describes a procedure in which the position and the orientation of the image capturing device, which are obtained on the basis of the above-mentioned projected positions of the indices on the captured image, are set as initial values. After that, iterative calculations are performed to minimize any positional error between actually-observed positions of the indices on the captured image and the calculated positions of the projected indices, namely, any positions calculated from the three-dimensional positions of the indices and the position and the orientation of the image capturing device, for optimizing the position and the orientation of the image capturing device.

Alternatively, instead of only using the image captured by the image capturing device, a procedure is performed such that a gyro sensor (to be exact, a three-axis orientation sensor structured by combining a plurality of gyro sensors for measuring angular-rates in three axis directions with a plurality of acceleration sensors in three axis directions; which is however herein referred to as gyro sensor for convenience) is mounted on the image capturing device to obtain the position and the orientation of the image capturing device while also using image information and gyro sensor information.

US Patent Application No. 2004-0090444 discloses a method of using a measured value of an orientation output from a gyro sensor as the orientation of an image capturing device and solving linear simultaneous equations on the basis of the orientation of the image capturing device and the correspondence between projected indices of indices on a captured image and three-dimensional positions of the indices to obtain a position of the image capturing device. Furthermore, the paper by K. Satoh, S. Uchiyama, and H. Yamamoto: "A head tracking method using bird's-eye view camera and gyroscope," Proc. 3rd IEEE/ACM Int'l Symp. on Mixed and Augmented Reality (ISMAR 2004), pp. 202-211, 2004 suggests a procedure where an inclination component of the measured value output from a gyro sensor is used as an inclination component of an orientation of the image capturing device. After that, iterative calculation is performed for optimizing a position and an azimuth component of the orientation of the image capturing device to minimize any positional error between the calculated positions and the observed positions of the projected indices on the captured image described above.

According to the above-mentioned method of only using the projected indices of the indices on the image captured by the image capturing device, the position and the orientation of the image capturing device thus obtained may be inaccurate or may have jitter because a detection error of the indices on the captured image occurs or because the resolution of the image is finite.

Then, the gyro sensor involves the generation of a drift error. Therefore, as time elapses, an error of the measured value in the azimuth direction is gradually generated. For this reason, when the measured orientation value output from the gyro sensor is set as the orientation of the image capturing device as it is, an inaccurate position of the image capturing device may be obtained in some cases.

Moreover, in order to obtain the position and the orientation of the image capturing device or the position and the azimuth component of the orientation of the image capturing device through iterative calculation, an initial value is required. When a result of the previous frame is used for the initial value, if the position and the orientation of the image capturing device are not obtained in the previous frame (for example, in the case where indices are not captured in the previous frame), the initial value cannot be obtained. When the position and the orientation of the image capturing device calculated only from the captured image are used for the initial value, the initial value may be inaccurate from the beginning as described above. Thus, even when the iterative calculations are carried out thereafter, the optimization occasionally cannot be achieved.

SUMMARY OF THE INVENTION

The present invention has been made in view of the above-mentioned problems.

According to an aspect of the present invention, there is provided a method of obtaining a position and orientation of an image capturing device or an object to which an inclination sensor is mounted without performing iterative calculation.

According to another aspect of the present invention, there is provided a method of obtaining relative positions and relative orientations between an image capturing device to which an inclination sensor is mounted and an object to which another inclination sensor is mounted without performing iterative calculation.

According to another aspect of the present invention, there is provided a position and orientation measuring method that includes the steps of: inputting a measured inclination value of an inclination sensor mounted to at least one of an object and an image capturing device; inputting a captured image from the image capturing device; detecting an index on the object from the captured image; and calculating a position and an orientation of one of the object and the image capturing device to which the inclination sensor is mounted on the basis of the measured inclination value, an image coordinate of the detected index, and known positional information on the detected index without performing an iterative calculation.

According to another aspect of the present invention, there is provided a position and orientation measuring method including the steps of: inputting a first measured inclination value of a first inclination sensor mounted to an object; inputting a second measured inclination value of a second inclination sensor mounted to an image capturing device; inputting a captured image from the image capturing device; detecting an index on the object from the captured image; and calculating relative position and relative orientation of the object and the image capturing device on the basis of the first measured inclination value, the second measured inclination value, an image coordinate of the detected index, and known positional information on the detected index without performing an iterative calculation.

Other features and advantages of the present invention will be apparent from the following description taken in conjunction with the accompanying drawings, in which like reference characters designate the same or similar parts throughout the drawings thereof.

BRIEF DESCRIPTION OF THE DRAWINGS

The accompanying drawings, which are incorporated in and constitute a part of the specification, illustrate embodiments of the invention and, together with the description, serve to explain the principles of the invention:

FIG. 9 is a flowchart for a method according to the third embodiment.

DESCRIPTION OF THE EMBODIMENTS

Preferred embodiments of the present invention will now be described in detail in accordance with the accompanying drawings.

First Embodiment

In this embodiment, a description will be given of the case where a position and orientation measuring apparatus and a method therefor according to the present invention are applied to the measurement of a position and an orientation of an image capturing device to which a gyro sensor is mounted. It should be noted that the gyro sensor of this embodiment refers to a three-axis orientation sensor structured by combining a plurality of gyro sensors for measuring angular-rates in three axis directions with a plurality of acceleration sensors for measuring accelerations in the three axis directions as described above. From the gyro sensor, a measured value of an inclination component is output at a certain level of reliability. However, a measured value of an azimuth component contains a drift error. For this reason, this embodiment is not only applicable to the gyro sensor, but also to any inclination sensor capable of measuring an inclination component of the orientation.

Figure 1:
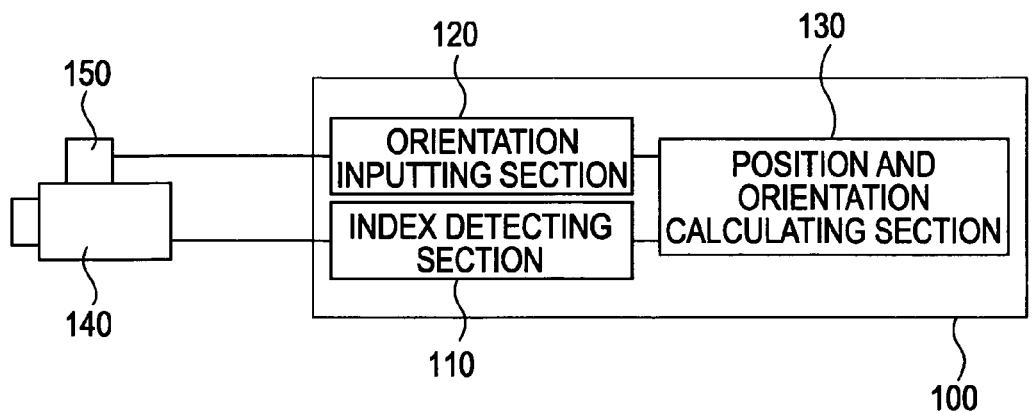
FIG. 1 shows a position and orientation measuring apparatus according to a first embodiment of the present invention.

FIG. 1 shows a construction of a position and orientation measuring apparatus of this embodiment. As shown in FIG. 1, a position and orientation measuring apparatus 100 according to this embodiment includes an index detecting section 110, an orientation inputting section 120, and a position and orientation calculating section 130. The position and orientation measuring apparatus 100 is connected to an image capturing device 140. A gyro sensor 150 is fixed on the image capturing device 140 and connected to the orientation inputting section 120.

Figure 2:
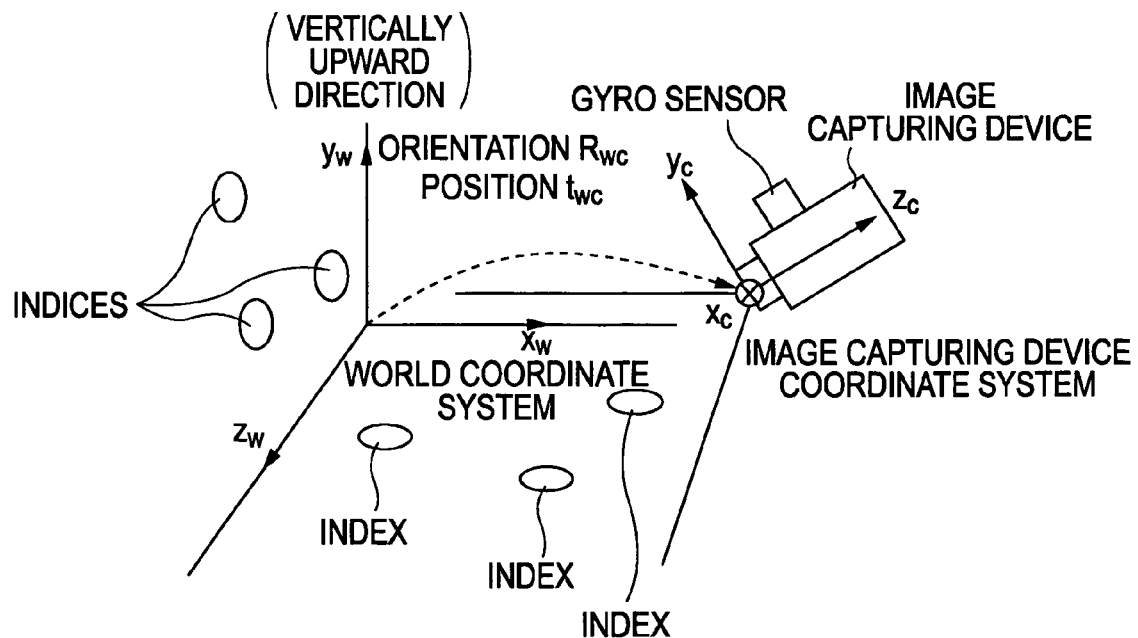
FIG. 2 shows a relation between coordinate systems according to the first embodiment.

FIG. 2 shows a relation between coordinate systems according to the first embodiment. In the world coordinate system, indices of each known position are arranged or set. The position and orientation measuring apparatus according to this embodiment measures the position and the orientation of the image capturing device with respect to the world coordinate system. In this embodiment, it is assumed that $y_w$ axis in the world coordinate system is in the vertically upward direction.

The gyro sensor 150 outputs an orientation of the image capturing device with respect to the world coordinate system. A 3×3 rotation matrix indicating the orientation of the image capturing device with respect to the world coordinate system is expressed as $R_{wc}$. A three dimensional position vector indicating the position of the image capturing device with respect to the world coordinate system is expressed as $t_{wc}$. $R_{wc}$ can be expressed by combining the following rotation transformations in the stated order: a rotation transformation about $z_w$ axis of the world coordinate system shown below.

$$R_{wc}^{z_w} \quad (1)$$

A rotation transformation about $X_w$ axis of the world coordinate system shown below.

$$R_{wc}^{x_w} \quad (2)$$

A rotation transformation about $Y_w$ axis of the world coordinate system shown below.

$$R_{wc}^{y_w} \quad (3)$$

Thus, $R_{wc}$ can be expressed by Expression (1) shown below.

$$R_{wc} = R_{wc}^{y_w} \cdot R_{wc}^{x_w} \cdot R_{wc}^{z_w} \quad (4)$$

Expression (1)

In Expression (1), inclination components of $R_{wc}$ are denoted as follows.

$$R_{wc}^{x_w}, R_{wc}^{z_w} \quad (5)$$

An azimuth component of $R_{wc}$ is denoted as follows.

$$R_{wc}^{y_w} \quad (6)$$

Then, the following are assigned.

$$R_{wc}^{i} = R_{wc}^{x_w} \cdot R_{wc}^{z_w}, R_{wc}^{a} = R_{wc}^{y_w} \quad (7)$$

Expression (1) can be expressed as Expression (2) (where i denotes an inclination and a denotes an azimuth).

$$R_{wc} = R_{wc}^{a} \cdot R_{wc}^{i} \quad (8)$$

Expression (2)

Therefore, the coordinate transformation from the world coordinate system to the coordinate system of the image capturing device (hereinafter, referred to as image capturing device coordinate system) can be expressed as shown below in Expression (3). At that time, the following is used.

$$R_{wc}^{i}, R_{wc}^{a} \quad (9)$$

Also, a position $t_{cw}$ of the origin of the world coordinate system in the image capturing device coordinate system is used.

$$x_c = (R_{wc}^{i})^{-1} \cdot (R_{wc}^{a})^{-1} \cdot x_w + t_{cw} \quad (10)$$

Expression (3)

In Expression (3), $x_w$ and $x_c$ denote coordinates of points in the world coordinate system and in the image capturing device coordinate system, respectively.

Here, the following (11) is described.

$$(R_{wc}^{i})^{-1} \quad (11)$$

The above (11) is expressed as Expression (4).

Expression (4)

$$(R_{wc}^{i})^{-1} = \begin{bmatrix} r_{11} & r_{12} & r_{13} \\ r_{21} & r_{22} & r_{23} \\ r_{31} & r_{32} & r_{33} \end{bmatrix} \quad (12)$$

An azimuth is denoted by $\theta$.

$$(R_{wc}^{a})^{-1} \quad (13)$$

The above (13) is expressed as Expression (5).

Expression (5)

$$(R_{wc}^{a})^{-1} = \begin{bmatrix} \cos\theta & 0 & -\sin\theta \\ 0 & 1 & 0 \\ \sin\theta & 0 & \cos\theta \end{bmatrix} \quad (14)$$

A projected position $(u_x, u_y)$ on the captured image of an index whose position in the world coordinate system is $x_w = [x_w y_w z_w]^t$ is expressed as Expression (6) where a focal distance is denoted by f and $\alpha = \cos\theta$, $\beta = \sin\theta$, $x_c = [x_c y_c z_c]^t$, and $t_{cw} = [t_x t_y t_z]^t$.

Expression (6)

$$u_x = -f\frac{x_c}{z_c} \quad (15)$$
$$= -f\frac{(r_{11}x_w + r_{13}z_w)\alpha + (r_{13}x_w - r_{11}z_w)\beta + t_x + r_{12}y_w}{(r_{31}x_w + r_{33}z_w)\alpha + (r_{33}x_w - r_{31}z_w)\beta + t_z + r_{32}y_w}$$

$$u_y = -f\frac{y_c}{z_c}$$
$$= -f\frac{(r_{21}x_w + r_{23}z_w)\alpha + (r_{23}x_w - r_{21}z_w)\beta + t_y + r_{22}y_w}{(r_{31}x_w + r_{33}z_w)\alpha + (r_{33}x_w - r_{31}z_w)\beta + t_z + r_{32}y_w}$$

Figure 3:
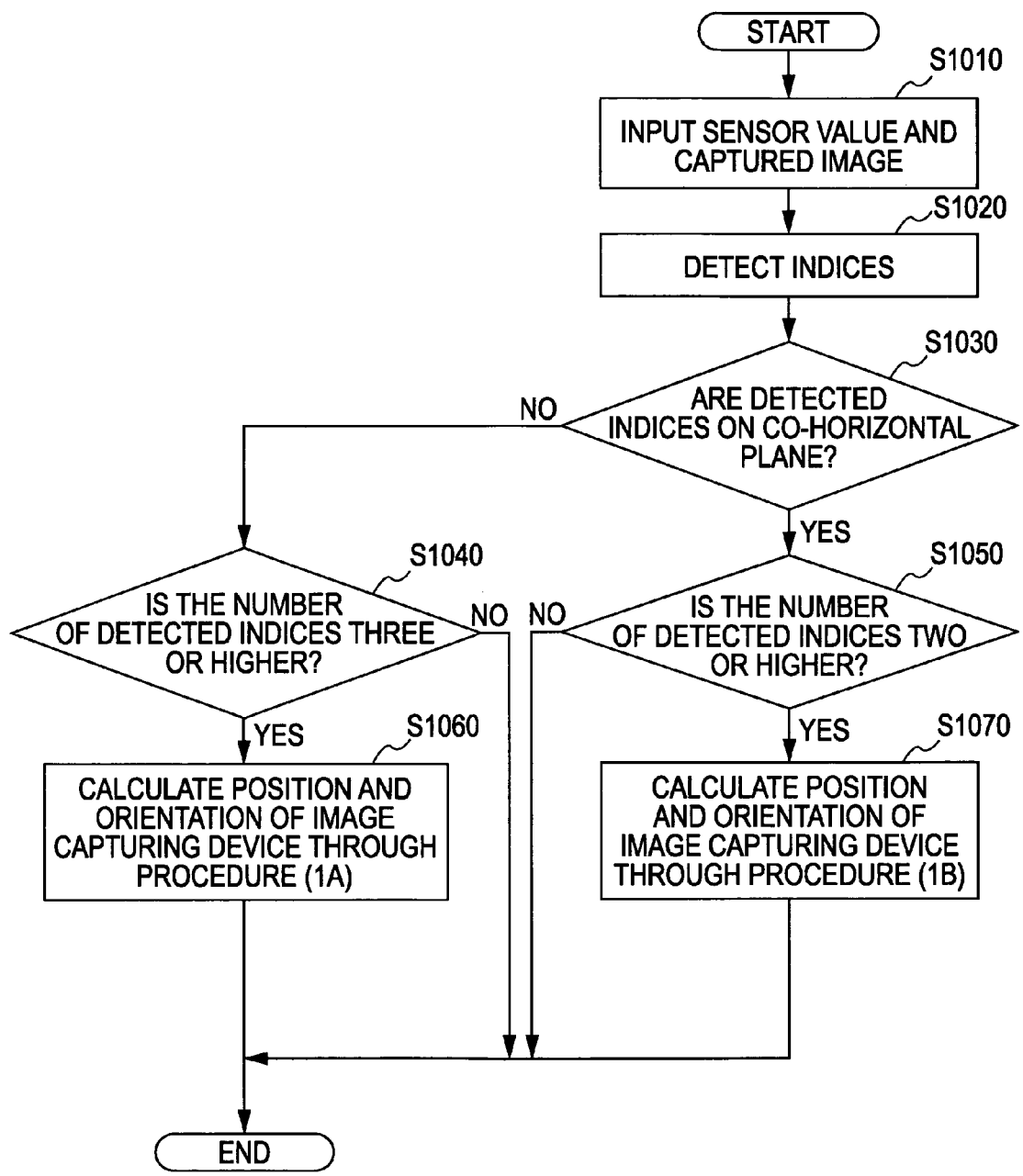
FIG. 3 is a flowchart for a method according to a first embodiment.

Next, a description will be given of a method of calculating the position and the orientation of the image capturing device with use of the indices detected on the image captured by the image capturing device and the inclination component of the orientation output from the gyro sensor. FIG. 3 is a flowchart for a method according to the first embodiment.

First, in Step S1010, the index detecting section 110 inputs an image from the image capturing device 140 and the orientation inputting section 120 inputs a measured value of the gyro sensor during the image capturing. The orientation inputting section 120 decomposes the measured value Rwc of the gyro sensor into an inclination component denoted as follows (16) and an azimuth component denoted as follows (17).

$$R_{wc}^{i} \quad (16)$$

$$R_{wc}^{a} \quad (17)$$

From Expression (4), $r_{11}, r_{12}, r_{13}, r_{21}, r_{22}, r_{23}, r_{31}, r_{32}$, and $r_{33}$ are obtained and output to the position and orientation calculating section 130. Then, in Step S1020, the index detecting section 110 detects indices on image capture, and outputs the detected indices to the position and orientation calculating section 130. Herein, the number of indices detected on the image is set as n.

$$(u_{x_i}, u_{y_i}) \quad (18)$$

The above (18) describes the detected positions of the detected indices i (i=1, 2, . . . , n) on the image.

Subsequently, in Step S1030, the position and orientation calculating section 130 judges whether or not all the detected indices are on a co-horizontal plane (the horizontal plane of this embodiment is expressed by the form that yw is a constant number). The judgment as to whether or not all the detected indices are on the co-horizontal plane is conducted, for example, in the following manners. Positions of the detected indices i (i=1, 2, . . . , n) in the world coordinate system are expressed as follows.

$$x_{w_i} = [x_{w_i} y_{w_i} z_{w_i}]^t \quad (19)$$

A variance $\sigma^2$ of $y_w$ coordinates of the detected indices is obtained form from Expression (7).

Expression (7)

$$\sigma^2 = \frac{\sum_{i=1}^{n}(y_{w_i} - \bar{y}_w)^2}{n} \quad (20)$$

In Expression (7), an average value of the $y_w$ coordinates of the indices is denoted as follows.

$$\bar{y}_w \quad (21)$$

The average value is obtained form Expression (8).

Expression (8)

$$\bar{y}_w = \frac{\sum_{i=1}^{n} y_{w_i}}{n} \tag{22}$$

When the variance $\sigma^2$ is equal to or lower than a predetermined value, it is judged that all the detected indices are on the horizontal co-plane. In Step S1030, when it is judged that the detected indices are on the horizontal co-plane, the flow advances to Step S1050, and when it is judged that the detected indices are not on the horizontal co-plane, the flow advances to Step S1040.

In Step S1040, the position and orientation calculating section 130 conducts judgment as to whether or not the number of the detected indices is three or higher. In Step S1040, when it is judged that the number of the detected indices is three or higher, the flow advances to Step S1060, and when it is judged that the number of the detected indices is lower than three, the flow ends. In Step S1050, judgment is conducted as to whether or not the number of the detected indices is two or higher. In Step S1050, when it is judged that the number of the detected indices is two or higher, the flow advances to Step S1070, and when it is judged that the number of the detected indices is lower than two, the flow ends.

In Step S1060, the position and orientation calculating section 130 employs a procedure (1A) to calculate the position and the orientation of the image capturing device and output the position and the orientation. Now, the procedure (1A) is described.

Expression (6) is simplified through division processes on the denominator and the numerator of the fraction. Then, the following are assigned.

$$u'_x = -u_x/f, u'_y = -u_y/f \tag{23}$$

As a result, linear equations for $\alpha$, $\beta$, $t_x$, $t_y$, and $t_z$ shown in Expression (9) are obtained.

$$(u'_x(r_{31}x_w + r_{33}z_w) - (r_{11}x_w + r_{13}z_w))\alpha + (u'_x(r_{33}x_w - r_{31}z_w) - (r_{13}x_w - r_{11}z_w))\beta - t_x + u'_x t_z = r_{12}y_w - u'_x r_{32}y_w (u'_y(r_{31}x_w + r_{33}z_w) - (r_{21}x_w + r_{23}z_w))\alpha + (u'_y(r_{33}x_w - r_{31}z_w) - (r_{23}x_w - r_{21}z_w))\beta - t_y + u'_y t_z = r_{22}y_w - u'_y r_{32}y_w \tag{24}$$

Expression (9)

The respective input indices (n points) are expressed as follows.

$$u'_{x_i} = -u_{x_i}/f, u'_{y_i} = -u_{y_i}/f \tag{25}$$

Then, the linear expressions of Expression (9) are established for the respective indices, simultaneous equations shown in Expression (10) are obtained.

By solving Expression (10), $\alpha$, $\beta$, $t_x$, $t_y$, and $t_z$ are obtained. In these simultaneous equations, the number of unknown numbers is five, and therefore at least three detected indices are necessary. Expression (10) is simplified and expressed as shown in Expression (11).

$$A \cdot x = b \tag{11}$$

where $x = [\alpha \beta t_x t_y t_z]^t$. A is a matrix with the number of rows being (2×n) and the number of columns being 5, and b is a (2×n)-dimension vector. Through the least-square method, x is obtained as expressed as Expression (12).

$$x = (A^t \cdot A)^{-1} \cdot A^t \cdot b \tag{12}$$

It should be noted that in Expression (12), a generalized inverse matrix of A is set as $(A^t \cdot A)^{-1}$, but as a matter of course other generalized inverse matrices may be used without impairing the essence of the present invention. Furthermore, the azimuth $\theta$ is calculated through Expression (13) using $\alpha$ and $\beta$ obtained from Expression (12).

Expression (13)

$$\theta = \begin{cases} \arctan\left(\frac{\beta}{\alpha}\right) & (\alpha \neq 0) \\ \frac{\pi}{2} & (\alpha = 0, \beta > 0) \\ -\frac{\pi}{2} & (\alpha = 0, \beta < 0) \end{cases} \tag{27}$$

To calculate the orientation $R_{wc}$ of the image capturing device with respect to the world coordinate system, the thus obtained $\theta$ is used and also the inclination component of the measured value of the sensor is used, which is denoted as follows.

$$R_{wc}^i \tag{28}$$

The calculation is conducted through Expression (14).

Expression (14)

$$R_{wc} = R_{wc}^a \cdot R_{wc}^i = \begin{bmatrix} \cos\theta & 0 & \sin\theta \\ 0 & 1 & 0 \\ -\sin\theta & 0 & \cos\theta \end{bmatrix} \cdot R_{wc}^i \tag{29}$$

After that, the position $t_{wc}$ of the image capturing device with respect to the world coordinate system is calculated through Expression (15).

$$t_{wc} = -R_{wc} \cdot t_{cw} \tag{15}$$

With the above-described method, in Step S1060, the position and the orientation of the image capturing device are calculated and output.

Expression (10)

$$\begin{bmatrix} u'_{x_1}(r_{31}x_{w_1} + r_{33}z_{w_1}) - r_{11}x_{w_1} - r_{13}z_{w_1} & u'_{x_1}(r_{33}x_{w_1} - r_{31}z_{w_1}) - r_{13}x_{w_1} + r_{11}z_{w_1} & -1 & 0 & u'_{x_1} \\ u'_{y_1}(r_{31}x_{w_1} + r_{33}z_{w_1}) - r_{21}x_{w_1} - r_{23}z_{w_1} & u'_{y_1}(r_{33}x_{w_1} - r_{31}z_{w_1}) - r_{23}x_{w_1} + r_{21}z_{w_1} & 0 & -1 & u'_{y_1} \\ u'_{x_2}(r_{31}x_{w_2} + r_{33}z_{w_2}) - r_{11}x_{w_2} - r_{13}z_{w_2} & u'_{x_2}(r_{33}x_{w_2} - r_{31}z_{w_2}) - r_{13}x_{w_2} + r_{11}z_{w_2} & -1 & 0 & u'_{x_2} \\ u'_{y_2}(r_{31}x_{w_2} + r_{33}z_{w_2}) - r_{21}x_{w_2} - r_{23}z_{w_2} & u'_{y_2}(r_{33}x_{w_2} - r_{31}z_{w_2}) - r_{23}x_{w_2} + r_{21}z_{w_2} & 0 & -1 & u'_{y_2} \\ \vdots & & & & \\ u'_{x_n}(r_{31}x_{w_n} + r_{33}z_{w_n}) - r_{11}x_{w_n} - r_{13}z_{w_n} & u'_{x_n}(r_{33}x_{w_n} - r_{31}z_{w_n}) - r_{13}x_{w_n} + r_{11}z_{w_n} & -1 & 0 & u'_{x_n} \\ u'_{y_n}(r_{31}x_{w_n} + r_{33}z_{w_n}) - r_{21}x_{w_n} - r_{23}z_{w_n} & u'_{y_n}(r_{33}x_{w_n} - r_{31}z_{w_n}) - r_{23}x_{w_n} + r_{21}z_{w_n} & 0 & -1 & u'_{y_n} \end{bmatrix} \begin{bmatrix} \alpha \\ \beta \\ t_x \\ t_y \\ t_z \end{bmatrix} = \begin{bmatrix} r_{12}y_{w_1} - u'_{x_1}r_{32}y_{w_1} \\ r_{22}y_{w_1} - u'_{y_1}r_{32}y_{w_1} \\ r_{12}y_{w_2} - u'_{x_2}r_{32}y_{w_2} \\ r_{22}y_{w_2} - u'_{y_2}r_{32}y_{w_2} \\ \vdots \\ r_{12}y_{w_n} - u'_{x_n}r_{32}y_{w_n} \\ r_{22}y_{w_n} - u'_{y_n}r_{32}y_{w_n} \end{bmatrix} \tag{26}$$

In Step S1070, the position and orientation calculating section 130 employs a procedure (1B) to calculate the position and the orientation of the image capturing device and output the position and the orientation. Now, the procedure (1B) is described.

The $y_w$ coordinate of the indices in the world coordinate system is set as $y_{avg}$. In Expression (6), $y_w=0$ and the following are assigned.

$$\alpha'=\alpha/t_z, \beta'=\beta/t_z, t'_x=t_x/t_z, t'_y=t_y/t_z \tag{30}$$

The simplification of the fraction is performed through division processes on the denominator and the numerator. Furthermore, the following are assigned.

$$u'_x=-u_x/f, u'_y=-u_y/f \tag{31}$$

As a result, Expression (16) is obtained.

$$(u'_x(r_{31}x_w+r_{33}z_w)-r_{11}x_w-r_{13}z_w)\alpha'+(u'_x(r_{33}x_w-r_{31}z_w)-r_{13}x_w+r_{11}z_w)\beta'-t'_x=-u'_x(u'_y(r_{31}x_w+r_{33}z_w)-r_{21}x_w-r_{23}z_w)\alpha'+(u'_y(r_{33}x_w-r_{31}z_w)-r_{23}x_w+r_{21}z_w)\beta'-t'_y=-u'_y \tag{32}$$

Expression (16)

Similarly, for the respective input indices (n points), the following are assigned.

$$u'_{xi}=-u_{xi}/f, u'_{yi}=-u_{yi}/f \tag{33}$$

Then, linear equations of Expression (16) are established for the respective indices, and simultaneous equations are obtained shown in Expression (17).

Expression (17)

$$\begin{bmatrix} u'_{x_1} & (r_{31}x_{w_1}+r_{33}z_{w_1})-r_{11}x_{w_1}-r_{13}z_{w_1} & u'_{x_1}(r_{33}x_{w_1}-r_{31}z_{w_1})-r_{13}x_{w_1}+r_{11}z_{w_1} & -1 & 0 \\ u'_{y_1} & (r_{31}x_{w_1}+r_{33}z_{w_1})-r_{21}x_{w_1}-r_{23}z_{w_1} & u'_{y_1}(r_{33}x_{w_1}-r_{31}z_{w_1})-r_{23}x_{w_1}+r_{21}z_{w_1} & 0 & -1 \\ u'_{x_2} & (r_{31}x_{w_2}+r_{33}z_{w_2})-r_{11}x_{w_2}-r_{13}z_{w_2} & u'_{x_2}(r_{33}x_{w_2}-r_{31}z_{w_2})-r_{13}x_{w_2}+r_{11}z_{w_2} & -1 & 0 \\ u'_{y_2} & (r_{31}x_{w_2}+r_{33}z_{w_2})-r_{21}x_{w_2}-r_{23}z_{w_2} & u'_{y_2}(r_{33}x_{w_2}-r_{31}z_{w_2})-r_{23}x_{w_2}+r_{21}z_{w_2} & 0 & -1 \\ & & \vdots & & \\ u'_{x_n} & (r_{31}x_{w_n}+r_{33}z_{w_n})-r_{11}x_{w_n}-r_{13}z_{w_n} & u'_{x_n}(r_{33}x_{w_n}-r_{31}z_{w_n})-r_{13}x_{w_n}+r_{11}z_{w_n} & -1 & 0 \\ u'_{y_n} & (r_{31}x_{w_n}+r_{33}z_{w_n})-r_{21}x_{w_n}-r_{23}z_{w_n} & u'_{y_n}(r_{33}x_{w_n}-r_{31}z_{w_n})-r_{23}x_{w_n}+r_{21}z_{w_n} & 0 & -1 \end{bmatrix} \begin{bmatrix} \alpha' \\ \beta' \\ t'_x \\ t'_y \end{bmatrix} = \begin{bmatrix} -u'_{x_1} \\ -u'_{y_1} \\ -u'_{x_2} \\ -u'_{y_2} \\ \vdots \\ -u'_{x_n} \\ -u'_{y_n} \end{bmatrix} \tag{34}$$

By solving Expression (17) through the method as shown in Expression (12), $\alpha'$, $\beta'$, $t'_x$, and $t'_y$ are obtained. In these simultaneous equations, the number of unknown numbers is four, and therefore at least two detected indices are required.

On the basis of $\alpha'$ and $\beta'$ obtained by solving Expression (17), the azimuth $\theta$ is calculated using Expression (18).

Expression (18)

$$\theta = \begin{cases} \arctan\left(\dfrac{\beta'}{\alpha'}\right) & (\alpha' \neq 0) \\ \dfrac{\pi}{2} & (\alpha' = 0, \beta' > 0) \\ -\dfrac{\pi}{2} & (\alpha' = 0, \beta' < 0) \end{cases} \tag{35}$$

To calculate the orientation $R_{wc}$ of the image capturing device with respect to the world coordinate system through Expression (14), the thus obtained $\theta$ is used and also the inclination component of the measured value of the sensor is used, which is denoted as follows.

$$R_{wc}^i \tag{36}$$

Also, $t_{cw}=[t_x, t_y, t_z]^t$ is obtained through Expression (19).

Expression (19)

$$t_z = \begin{cases} \dfrac{\alpha}{\alpha'} & (\alpha' \neq 0) \\ \dfrac{\beta}{\beta'} & (\alpha' = 0) \end{cases} \tag{37}$$

$$t_x = t'_x \cdot t_z$$
$$t_y = t'_y \cdot t_z$$

Furthermore, the position $t_{wc}$ of the image capturing device with respect to the world coordinate system is calculated through Expression (20).

Expression (20)

$$t_{WC} = -R_{WC} \cdot t_{CW} + \begin{bmatrix} 0 \\ y_{avg} \\ 0 \end{bmatrix} \tag{38}$$

With the above-described method, in Step S1070, the position and the orientation of the image capturing device are calculated and output.

As described above, according to this embodiment, when the gyro sensor is mounted to the image capturing device, it is possible to directly calculate the position and the orientation of the image capturing device from the inclination component of the measured value of the sensor and the image information through a method in which iterative calculation is unnecessary.

That is, after the gyro sensor is mounted to the image capturing device, by using the image captured by the image capturing device and only the inclination component of the measured orientation value output from the gyro sensor without performing the iterative calculation (in other words, without using the initial value), the position and the orientation of the image capturing device can be obtained directly. As a result, it is possible to avoid the degradation in accuracy of calculating the position and the orientation, which is attributed to the initial value, generated when the iterative calculation is performed. In fact, when the indices are captured on the captured image, the position and the orientation can be calculated with a high degree of accuracy. In this embodiment, the position and orientation measuring method employing the image information created by one camera has been described. According to a certain AR application, stereo display is usable, so there are some cases where a stereo camera is mounted to a head mounted display (HMD). In the case where such an HMD sensor is mounted, if one inclination sensor is mounted to each camera constituting a stereo pair, an inclination of each camera is uniquely determined as in the case of using one camera. Accordingly, in the position and orientation measuring method described in this embodiment, indices obtained from the respective cameras of the stereo camera may also be used. In addition, as long as relative positions and relative orientations between cameras are known, the number of cameras is not limited to two and any numbers of cameras may also be used.

Second Embodiment

In the first embodiment, the gyro sensor was mounted to the image capturing device to obtain the position and orientation of the image capturing device. Meanwhile, in a second embodiment, a description will be given of the case where a position and orientation measuring apparatus and a method therefor are applied to the measurement of a position and an orientation of a moving object captured by the image capturing device that is fixed in the world coordinate system.

Figure 4:
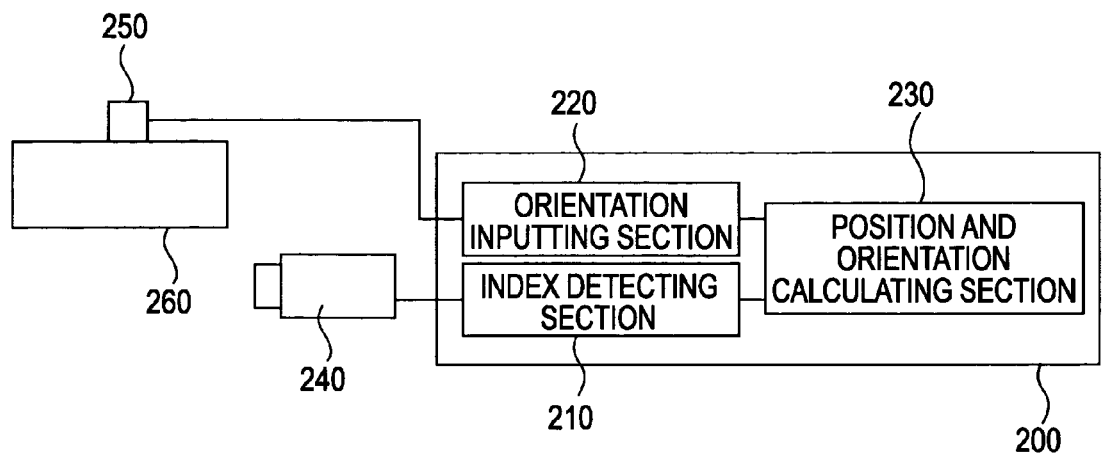
FIG. 4 shows a position and orientation measuring apparatus according to a second embodiment of the present invention.

FIG. 4 shows a construction of a position and orientation measuring apparatus according to the second embodiment. As shown in FIG. 4, a position and orientation measuring apparatus 200 according to the second embodiment includes an index detecting section 210, an orientation inputting section 220, and a position and orientation calculating section 230. An image capturing device 240 fixed in the world coordinate system is connected to the index detecting section 210. A gyro sensor 250 mounted on a moving object 260 is connected to the orientation inputting section 220. In the second embodiment, indices on the moving object detected in an image captured by the image capturing device 240 and an inclination component of a measured value of the gyro sensor mounted on the moving object are used to measure a position and an orientation of the moving object with respect to the world coordinate system.

Figure 5:
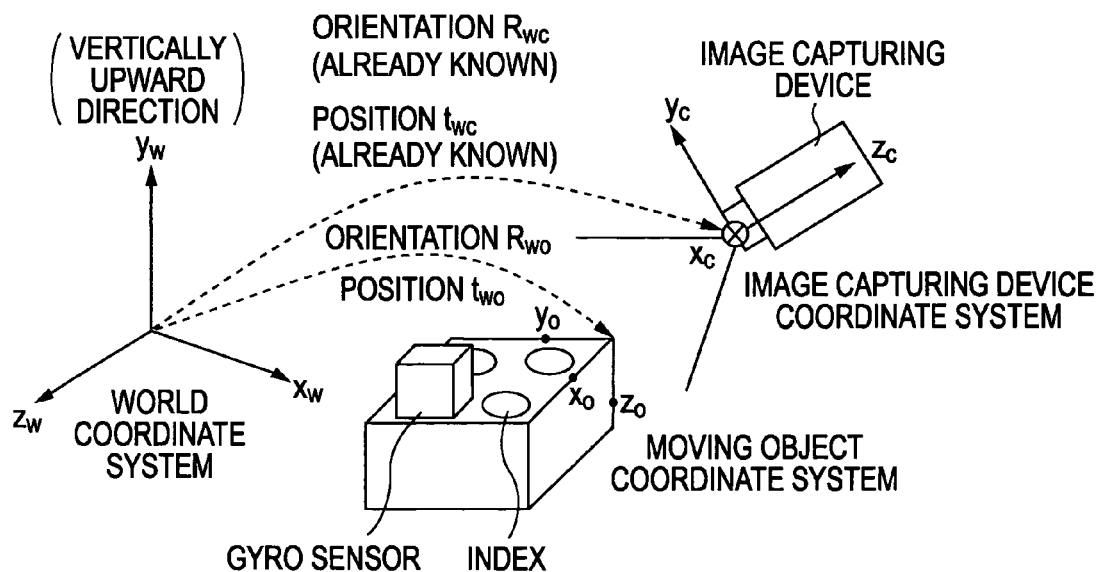
FIG. 5 shows a relation among coordinate systems according to the second embodiment.

FIG. 5 shows a relation among coordinate systems according to the second embodiment. Indices of each known position in the moving object coordinate system are arranged or set on the moving object. The image capturing device is fixed in the world coordinate system, and a three dimensional position vector $t_{wc}$ indicating a position and 3×3 rotation matrix $R_{wc}$ indicating an orientation of the image capturing device in the world coordinate system are already known. In the second embodiment, an orientation $R_{wo}$ and a position $t_{wo}$ of the moving object with respect to the world coordinate system are obtained.

The 3×3 rotation matrix $R_{wo}$ indicating the orientation of the moving object with respect to the world coordinate system is decomposed into an inclination component denoted as follows.

$$R_{wo}^i \quad (39)$$

Also, the rotation matrices are decomposed into an azimuth component denoted as follows.

$$R_{wo}^a \quad (40)$$

The decomposition is conducted as shown in Expression (21).

$$R_{wo}=R_{wo}^a \cdot R_{wo}^i \quad (41)$$

Expression (21)

The coordinate transformation from a moving object coordinate system $x_o$ to an image capturing device coordinate system $x_c$ can be expressed by using the following.

$$R_{wo}^i, R_{wo}^a \quad (42)$$

Also, the position $t_{co}$ of the moving object in the image capturing device coordinate system is used as Expression (22).

$$x_c = (R_{wc})^{-1} \cdot R_{wo}^a \cdot R_{wo}^i \cdot x_o + t_{co} \quad (43)$$

Expression (22)

Here, the following procedure is performed.

$$(R_{wc})^{-1} \quad (44)$$

The above (44) is expressed as Expression (23).

Expression (23)

$$(R_{wc})^{-1} = \begin{bmatrix} R_{11} & R_{12} & R_{13} \\ R_{21} & R_{22} & R_{23} \\ R_{31} & R_{32} & R_{33} \end{bmatrix} \quad (45)$$

Furthermore, an azimuth is denoted by θ.

$$R_{wo}^a \quad (46)$$

The above (46) is expressed as Expression (24).

Expression (24)

$$R_{wo}^a = \begin{bmatrix} \cos\theta & 0 & \sin\theta \\ 0 & 1 & 0 \\ -\sin\theta & 0 & \cos\theta \end{bmatrix} \quad (47)$$

Then, the following is assigned.

$$X'_o = [x'_o\, y'_o\, z'_o]^t = R_{wo}^i \cdot X_o \quad (48)$$

The index located at $x_o=[x_o y_o z_o]^t$ in the moving object coordinate has a position $(u_x, u_y)$ on the captured image. While a focal distance is denoted by f, α=cos θ, β=sin θ, $x_c=[x_c y_c z_c]^t$, and $t_{co}=[t_{ox} t_{oy} t_{oz}]^t$, the projected position is expressed as Expression (25).

Expression (25)

$$u_x = -f\frac{x_c}{z_c} \quad (49)$$
$$= -f\frac{(R_{11}x'_o + R_{13}z'_o)\alpha + (R_{11}z'_o - R_{13}x'_o)\beta + t_{ox} + R_{12}y'_o}{(R_{31}x'_o + R_{33}z'_o)\alpha + (R_{31}z'_o - R_{33}x'_o)\beta + t_{oz} + R_{32}y'_o}$$

$$u_y = -f\frac{y_c}{z_c}$$
$$= -f\frac{(R_{21}x'_o + R_{23}z'_o)\alpha + (R_{21}z'_o - R_{23}x'_o)\beta + t_{oy} + R_{22}y'_o}{(R_{31}x'_o + R_{33}z'_o)\alpha + (R_{31}z'_o - R_{33}x'_o)\beta + t_{oz} + R_{32}y'_o}$$

Figure 6:
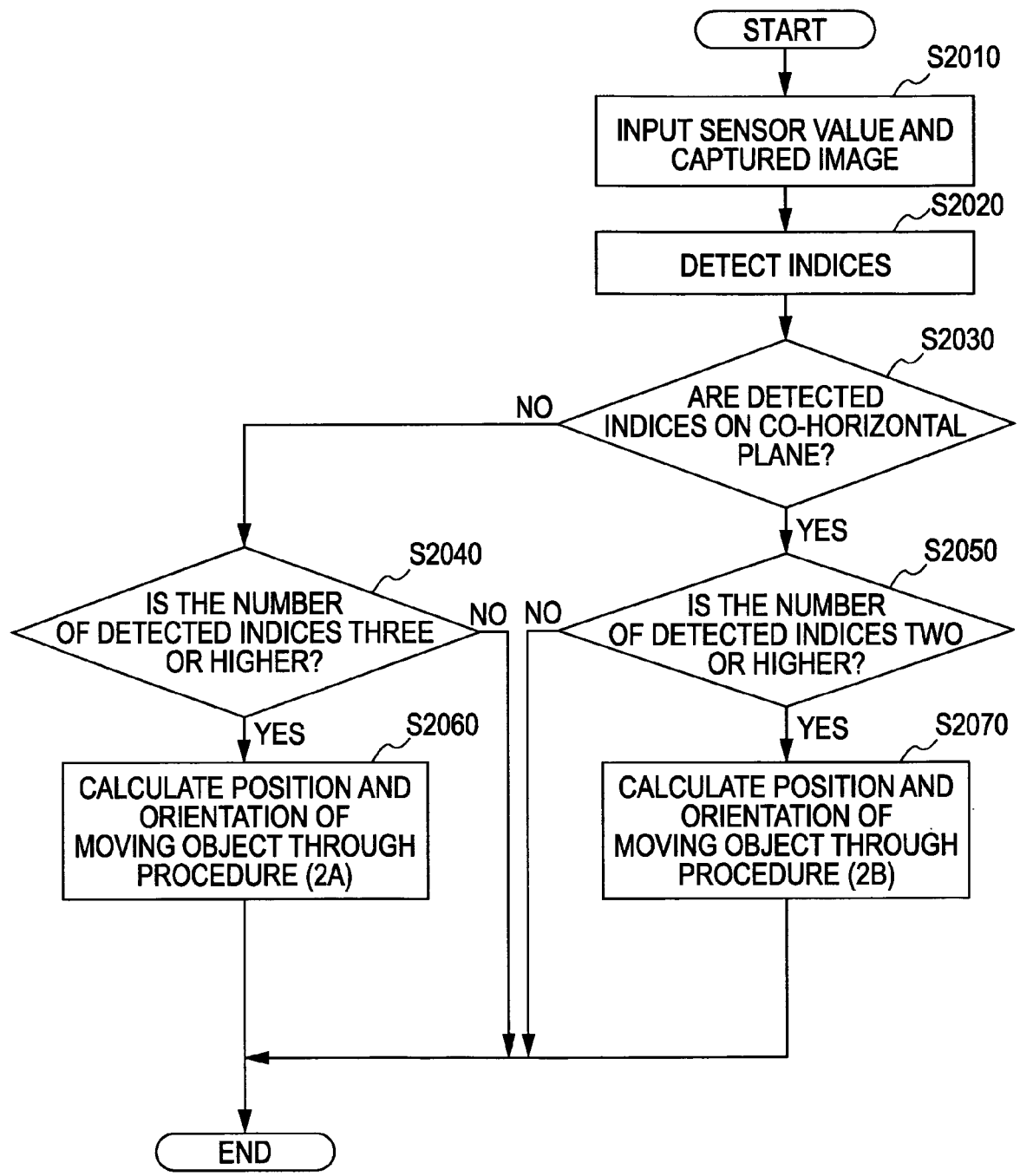
FIG. 6 is a flowchart for a method according to the second embodiment.

Next, a description will be given of a method of calculating the position and the orientation of the moving object with use of the indices detected on the image captured by the image capturing device and the inclination component output from the gyro sensor. FIG. 6 is a flowchart for a method according to the second embodiment.

First of all, in Step S2010, the index detecting section 210 inputs an image from the image capturing device 240. The orientation inputting section 220 inputs the measured value $R_{wo}$ of the gyro sensor mounted on the moving object at the same time as the image capturing, and decomposes the measured value into an inclination component denoted as follows.

$$R_{wo}^i \quad (50)$$

Also, the measured value is decomposed into an azimuth component denoted as follows.

$$R_{wo}^a \quad (51)$$

From Expression (23), the already known values $R_{11}$, $R_{12}$, $R_{13}$, $R_{21}$, $R_{22}$, $R_{23}$, $R_{31}$, $R_{32}$, and $R_{33}$ are obtained and output to the position and orientation calculating section 230. Next, in Step S2020, the index detecting section 210 detects indices on the moving object from the captured image to output the detected indices to the position and orientation calculating section 230. Herein, the number of the indices detected on the captured image is set as n, and detected positions of the detected indices i (i=1, 2, ..., n) on the captured image are set as follows.

$$(u_{x_i}, u_{y_i}) \quad (52)$$

Next, in Step S2030, the position and orientation calculating section 230 judges whether or not all the detected indices are on a co-horizontal plane. The judgment as to whether or not all the detected indices are on the co-horizontal plane is conducted, for example, in the following manner. The positions of the detected indices i (i=1, 2, ..., n) in the moving object coordinate system are set as follows.

$$x_{o_i} = [x_{o_i} y_{o_i} z_{o_i}]^t, x'_{o_i} = [x'_{o_i} y'_{o_i} z'_{o_i}]^t = R_{wo}^i \cdot x_{o_i} \quad (53)$$

From Expression (26), the variance $\sigma^2$ of $y_w$ coordinates of the detected indices on is obtained.

Expression (26)

$$\sigma^2 = \frac{\sum_{i=1}^{n}(y'_{o_i} - \bar{y}_w)^2}{n} \quad (54)$$

In Expression (26), an average value of $y_w$ coordinates of the indices is denoted as follows.

$$\bar{y}_w \quad (55)$$

The average value is obtained from Expression (27).

Expression (27)

$$\bar{y}_w = \frac{\sum_{i=1}^{n} y'_{o_i}}{n} \quad (56)$$

When the variance $\sigma^2$ is lower than a predetermined value, it is judged that all the detected indices are on the horizontal co-plane. In Step S2030, when the detected indices are on the horizontal co-plane, the flow advances to Step S2050, and when it is judged that the detected indices are not on the horizontal co-plane, the flow advances to Step S2040. In Step S2040, the position and orientation calculating section 230 conducts judgment as to whether or not the number of the detected indices is three or higher. In Step S2040, when it is judged that the number of the detected indices is three or higher, the flow advances to Step S2060, and when it is judged that the number of the detected indices is lower than three, the flow ends. In Step S2050, judgment is conducted as to whether or not the number of the detected indices is two or higher. In Step S2050, when it is judged that the number of the detected indices is two or higher, the flow advances to Step S2070, and when it is judged that the number of the detected indices is lower than two, the flow ends.

In Step S2060, the position and orientation calculating section 230 employs a procedure (2A) to calculate and output the position and the orientation of the moving object. Now, the procedure (2A) is described. First, Expression (25) is simplified through division processes on the denominator and the numerator of the fraction. To obtain $\alpha$, $\beta$, $t_{ox}$, $t_{oy}$, and $t_{oz}$, the following are assigned.

$$u'_{x_i} = -u_{x_i}/f, u'_{y_i} = -u_{y_i}/f \quad (57)$$

Then, a linear equation for $\alpha$, $\beta$, $t_{ox}$, $t_{oy}$, and $t_{oz}$ thus obtained is established for each of the detected indices. As a result, simultaneous equations shown in Expression (28) are obtained.

Expression (28)

$$\begin{bmatrix} u'_{x_1}(R_{31}x'_{o_1}+R_{33}z'_{o_1})-R_{11}x'_{o_1}-R_{13}z'_{o_1} & u'_{x_1}(R_{31}z'_{o_1}-R_{33}x'_{o_1})-R_{11}z'_{o_1}+R_{13}x'_{o_1} & -1 & 0 & u'_{x_1} \\ u'_{y_1}(R_{31}x'_{o_1}+R_{33}z'_{o_1})-R_{21}x'_{o_1}-R_{23}z'_{o_1} & u'_{y_1}(R_{31}z'_{o_1}-R_{33}x'_{o_1})-R_{21}z'_{o_1}+R_{23}x'_{o_1} & 0 & -1 & u'_{y_1} \\ u'_{x_2}(R_{31}x'_{o_2}+R_{33}z'_{o_2})-R_{11}x'_{o_2}-R_{13}z'_{o_2} & u'_{x_2}(R_{31}z'_{o_2}-R_{33}x'_{o_2})-R_{11}z'_{o_2}+R_{13}x'_{o_2} & -1 & 0 & u'_{x_2} \\ u'_{y_2}(R_{31}x'_{o_2}+R_{33}z'_{o_2})-R_{21}x'_{o_2}-R_{23}z'_{o_2} & u'_{y_2}(R_{31}z'_{o_2}-R_{33}x'_{o_2})-R_{21}z'_{o_2}+R_{23}x'_{o_1} & 0 & -1 & u'_{y_2} \\ & & \vdots & & \\ u'_{x_n}(R_{31}x'_{o_n}+R_{33}z'_{o_n})-R_{11}x'_{o_n}-R_{13}z'_{o_n} & u'_{x_n}(R_{31}z'_{o_n}-R_{33}x'_{o_n})-R_{11}z'_{o_n}+R_{13}x'_{o_n} & -1 & 0 & u'_{x_n} \\ u'_{y_n}(R_{31}x'_{o_n}+R_{33}z'_{o_n})-R_{21}x'_{o_n}-R_{23}z'_{o_n} & u'_{y_n}(R_{31}z'_{o_n}-R_{33}x'_{o_n})-R_{21}z'_{o_n}+R_{23}x'_{o_n} & 0 & -1 & u'_{y_n} \end{bmatrix} \begin{bmatrix} \alpha \\ \beta \\ t_{ox} \\ t_{oy} \\ t_{oz} \end{bmatrix} = \begin{bmatrix} -u'_{x_1}R_{32}y'_{o_1}+R_{12}y'_{o_1} \\ -u'_{y_1}R_{32}y'_{o_1}+R_{22}y'_{o_1} \\ -u'_{x_2}R_{32}y'_{o_2}+R_{12}y'_{o_2} \\ -u'_{y_2}R_{32}y'_{o_2}+R_{22}y'_{o_2} \\ \vdots \\ -u'_{x_n}R_{32}y'_{o_n}+R_{12}y'_{o_n} \\ -u'_{y_n}R_{32}y'_{o_n}+R_{22}y'_{o_n} \end{bmatrix} \quad (58)$$

By solving Expression (28), $\alpha$, $\beta$, $t_{ox}$, $t_{oy}$, $t_{oz}$ are obtained. In these simultaneous equations, the number of unknown numbers is five, and therefore at least three detected indices are necessary. From $\alpha$ and $\beta$, the azimuth $\theta$ is calculated through Expression (13). To calculate the orientation $R_{wo}$ of the moving object with respect to the world coordinate system, the thus obtained $\theta$ is used and also the inclination component of the measured value of the sensor is used, which is denoted as follows.

$$R_{wo}^i \quad (59)$$

The calculation is conducted through Expression (29).

Expression (29)

$$R_{wo} = R_{wo}^a \cdot R_{wo}^i = \begin{bmatrix} \cos\theta & 0 & \sin\theta \\ 0 & 1 & 0 \\ -\sin\theta & 0 & \cos\theta \end{bmatrix} \cdot R_{wo}^i \quad (60)$$

Furthermore, a position of the moving object in the world coordinate system $t_{wo}$ is calculated through Expression (30).

$$t_{wo} = R_{wc} \cdot t_{co} + t_{wc} \quad \text{Expression (30)}$$

With the above-described method, in Step S2060, the position and the orientation of the moving object are calculated and output.

In Step S2070, the position and orientation calculating section 230 employs a procedure (2B) to calculate and output the position and the orientation of the moving object. Now, the procedure (2B) is described.

A $y_w$ coordinate of the index in the world coordinate system is set as $y_{avg}$. In Expression (25), the following is assigned.

$$y'_o = 0 \qquad (61)$$

Then, the following are assigned.

$$\alpha' = \alpha/t_{oz}, \beta' = \beta/t_{oz}, t'_{ox} = t_{ox}/t_{oz}, t'_{oy} = t_{oy}/t_{oz} \qquad (62)$$

Division processes on the denominator and the numerator of the fraction are performed. Then, the following are assigned.

$$u'_{x_i} = -u_{x_i}/f, u'_{y_i} = -u_{y_i}/f \qquad (63)$$

Therefore, $\alpha'$, $\beta'$, $t'_{ox}$, $t'_{oy}$ are obtained. A linear equation for $\alpha'$, $\beta'$, $t'_{ox}$, $t'_{oy}$ thus obtained is established for each of the detected indices. Simultaneous equations shown in Expression (31) are accordingly obtained.

Expression (31)

$$\begin{bmatrix} u'_{x_1}(R_{31}x'_{o_1}+R_{33}z'_{o_1})-R_{11}x'_{o_1}-R_{13}z'_{o_1} & u'_{x_1}(R_{31}z'_{o_1}-R_{33}x'_{o_1})-R_{11}z'_{o_1}+R_{13}x'_{o_1} & -1 & 0 \\ u'_{y_1}(R_{31}x'_{o_1}+R_{33}z'_{o_1})-R_{21}x'_{o_1}-R_{23}z'_{o_1} & u'_{y_1}(R_{31}z'_{o_1}-R_{33}x'_{o_1})-R_{21}z'_{o_1}+R_{23}x'_{o_1} & 0 & -1 \\ & & \vdots & \\ u'_{x_n}(R_{31}x'_{o_n}+R_{33}z'_{o_n})-R_{11}x'_{o_n}-R_{13}z'_{o_n} & u'_{x_n}(R_{31}z'_{o_n}-R_{33}x'_{o_n})-R_{11}z'_{o_n}+R_{13}x'_{o_n} & -1 & 0 \\ u'_{y_n}(R_{31}x'_{o_n}+R_{33}z'_{o_n})-R_{21}x'_{o_n}-R_{23}z'_{o_n} & u'_{y_n}(R_{31}z'_{o_n}-R_{33}x'_{o_n})-R_{21}z'_{o_n}+R_{23}x'_{o_n} & 0 & -1 \end{bmatrix} \begin{bmatrix} \alpha' \\ \beta' \\ t'_{ox} \\ t'_{oy} \end{bmatrix} = \begin{bmatrix} -u'_{x_1} \\ -u'_{y_1} \\ \vdots \\ -u'_{x_n} \\ -u'_{y_n} \end{bmatrix} \qquad (64)$$

In these simultaneous equations, the number of unknown numbers is four, and therefore at least two detected indices are necessary. From $\alpha'$ and $\beta'$ obtained by solving Expression (31), the azimuth $\theta$ is calculated through Expression (18). To calculate the orientation $R_{wo}$ of the moving object with respect to the world coordinate system through Expression (29), the thus obtained $\theta$ is used and also the inclination component of the measured value of the sensor is used, which is denoted as follows.

$$R_{wo}{}^i \qquad (65)$$

Then, $t_{co}=[t_{ox}t_{oy}t_{oz}]^t$ is calculated through Expression (32).

Expression (32)

$$t_{oz} = \begin{cases} \dfrac{\alpha}{\alpha'} & (\alpha' \neq 0) \\ \dfrac{\beta}{\beta'} & (\alpha' = 0) \end{cases} \qquad (66)$$

$$t_{ox} = t'_{ox} \cdot t_{oz}$$

$$t_{oy} = t'_{oy} \cdot t_{oz}$$

Furthermore, a position in the world coordinate system $t_{wo}$ of the moving object is calculated through Expression (33).

Expression (33)

$$t_{wo} = R_{wc} \cdot t_{co} + t_{wc} - \begin{bmatrix} 0 \\ y_{avg} \\ 0 \end{bmatrix} \qquad (67)$$

With the above-described method, in Step S2070, the position and the orientation of the moving object are calculated and output.

As described above, when the gyro sensor is mounted to the moving object according to this embodiment, with the above-described method, it is possible to calculate the position and the orientation of the moving object from the inclination component of the measured value of the sensor and the image information on the image capturing device fixed in the world coordinate system without performing the iterative calculation.

According to this embodiment, the gyro sensor is mounted to the moving object, and the only the image of the moving object captured by the image capturing device and the inclination component of the measured orientation value of the gyro sensor are used, and the position and the orientation of the moving object can be calculated directly without performing the iterative calculation (in other words, without using the initial value). As a result, it is possible to avoid the degradation in accuracy of calculating the position and the orientation, which is attributed to the initial value, generated when the iterative calculation is performed. In fact, when the indices are captured on the captured image, the position and the orientation can be calculated with a high degree of accuracy.

In this embodiment, the position and orientation measuring method in which the image information on one camera is used has been described. The camera of this embodiment is an objective viewpoint camera whose position and orientation in the world coordinate system are already known. When a position of the objective viewpoint camera in the world coordinate system is set as $t_{wc}$ ($=[x_{wc}y_{wc}z_{wc}]^t$) and a 3×3 rotation matrix indicating an orientation of the camera is expressed as $R_{wc}$, the coordinate transformation from the moving object coordinate system $x_o$ to the image capturing device coordinate system $x_c$, is expressed as Expression (34) while a position of the moving object in the world coordinate system $t_{wo}$ ($=[x_{wo}y_{wo}z_{wo}]^t$) is used.

$$x_c = (R_{wc})^{-1} \cdot (R_{wo}{}^a \cdot R_{wo}{}^i \cdot x_o + t_{wo} - t_{wc}) \qquad (68)$$

Expression (34)

$$x'_o = [x'_o y'_o z'_o]^t = R_{wo}{}^i \cdot x_{oi} \qquad (69)$$

A point represented as follows (70) is represented as follows (71) using Expressions 23, 24, and 34.

$$x'_o \qquad (70)$$

A projected position ($u_x$, $u_y$) of the point on the captured image is expressed as Expression (35).

Expression (35)

$$u_x = -f \frac{(R_{11}x'_o + R_{13}z'_o)\alpha + (R_{11}z'_o + R_{13}x'_o)\beta + R_{11}x_{wo} + R_{12}y_{wo} + R_{13}z_{wo} - (R_{11}x_{wc} + R_{12}y_{wc} + R_{13}z_{wc})}{(R_{31}x'_o + R_{33}z'_o)\alpha + (R_{31}z'_o + R_{33}x'_o)\beta + R_{31}x_{wo} + R_{32}y_{wo} + R_{33}z_{wo} - (R_{31}x_{wc} + R_{32}y_{wc} + R_{33}z_{wc})} \qquad (71)$$

$$u_y = -f \frac{(R_{21}x'_o + R_{23}z'_o)\alpha + (R_{21}z'_o - R_{23}x'_o)\beta + R_{21}x_{wo} + R_{22}y_{wo} + R_{23}z_{wo} - (R_{21}x_{wc} + R_{22}y_{wc} + R_{23}z_{wc})}{(R_{31}x'_o + R_{33}z'_o)\alpha + (R_{31}z'_o - R_{33}x'_o)\beta + R_{31}x_{wo} + R_{32}y_{wo} + R_{33}z_{wo} - (R_{31}x_{wc} + R_{32}y_{wc} + R_{33}z_{wc})}$$

Expression (35) is an observation equation established for the respective indices detected on the captured image with $t_{wo}$, α, and β as unknown parameters. By establishing this observation equation for indices captured on the captured image by a plurality of cameras, in the same method described in this embodiment, it is possible to obtain $t_{wo}$, α, and β. That is, this embodiment is not limited to the case of using one camera but can be applied to the image information by a plurality of cameras whose positions and orientations are already known in the world coordinate system.

Third Embodiment

In the second embodiment, the image capturing device is fixed in the world coordinate system and the gyro sensor is mounted to the moving object. Meanwhile, in a third embodiment, a description will be given of a position and orientation measuring apparatus and a method therefor, which are employed in the case where the gyro sensors are mounted to both the image capturing device and the moving object for measuring the position and the orientation of the moving object with respect to the image capturing device.

Figure 7:
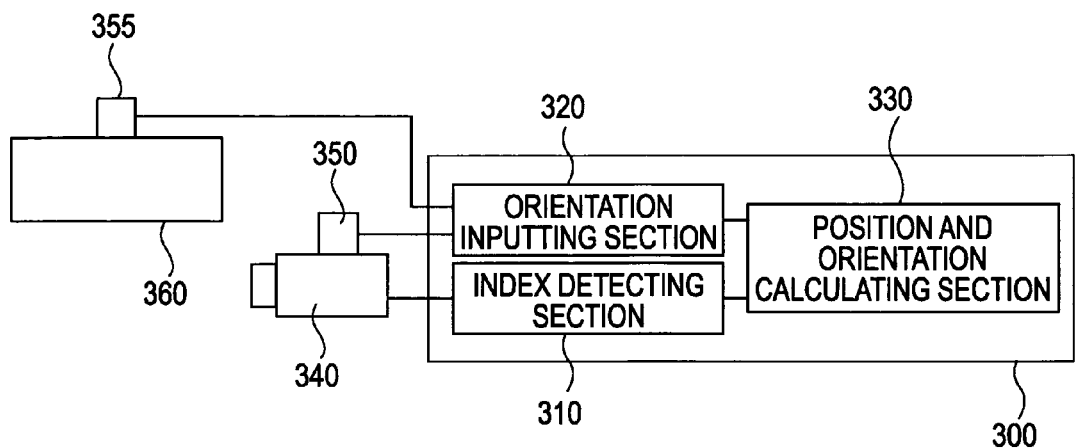
FIG. 7 shows a position and orientation measuring apparatus according to a third embodiment of the present invention.
Figure 8:
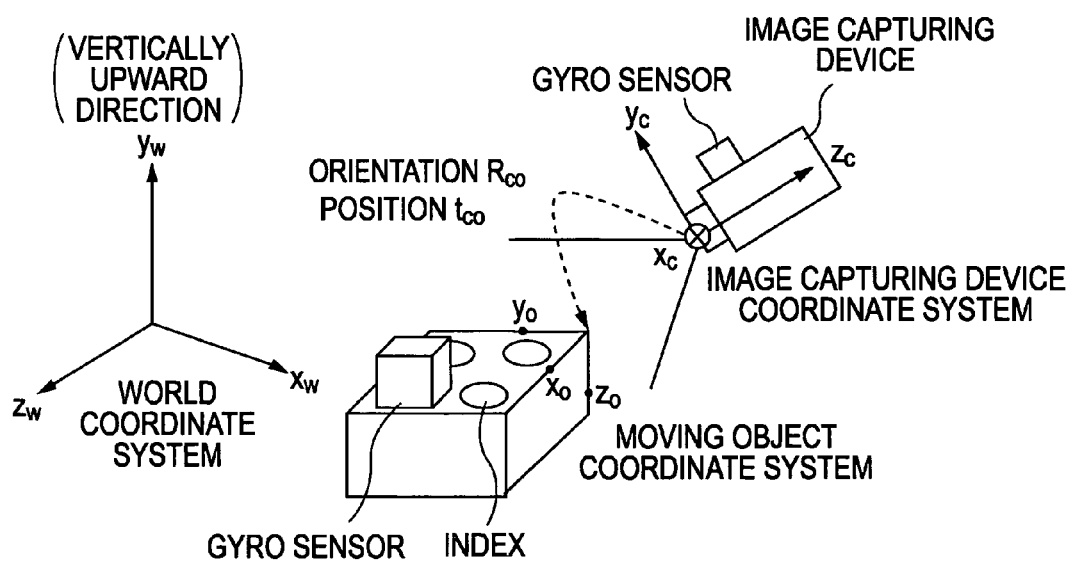
FIG. 8 shows a relation among coordinate systems according to the third embodiment.

FIG. 7 shows a construction of a position and orientation measuring apparatus according to the third embodiment. As shown in FIG. 7, a position and orientation measuring apparatus 300 according to the third embodiment includes an index detecting section 310, an orientation inputting section 320, and a position and orientation calculating section 330. An image capturing device 340 is connected to the index detecting section 310. A gyro sensor 355 is mounted to a moving object 360, and a gyro sensor 350 is mounted to the image capturing device 340. The gyro sensors 350 and 355 are connected to the orientation inputting section 320. In the third embodiment, indices of the moving object detected in an image captured by the image capturing device 340 and inclination components of measured values of the gyro sensors respectively mounted to the moving object and the image capturing device are used, and thus the position and the orientation of the moving object with respect to the image capturing device are obtained. FIG. 8 shows a relation among coordinate systems according to the third embodiment. In the third embodiment, the orientation $R_{co}$ and the position $t_{co}$ of the moving object with respect to the image capturing device coordinate system are obtained. A 3×3 rotation matrix indicating the orientation of the moving object in the world coordinate system is represented as $R_{wo}$, and 3×3 rotation matrices indicating the position of the image capturing device are represented as $R_{wc}$. $R_{wo}$ is decomposed into an inclination component denoted as follows.

$$R_{wo}^{i} \tag{72}$$

$R_{wo}$ is also decomposed into an azimuth component denoted as follows.

$$R_{wo}^{a} \tag{73}$$

The decomposition is expressed as shown in Expression (36).

$$R_{wo} = R_{wo}^{a} \cdot R_{wo}^{i} \tag{74}$$

Expression (36)

Also, $R_{wc}$ is decomposed into an inclination component denoted as follows.

$$R_{wc}^{i} \tag{75}$$

$R_{wc}$ is also decomposed into an azimuth component denoted as follows.

$$R_{wc}^{a} \tag{76}$$

The decomposition is expressed as shown in Expression (37).

$$R_{wc} = R_{wc}^{a} \cdot R_{wc}^{i} \tag{77}$$

Expression (37)

For the transformation from the moving object coordinate system $x_o$ to the image capturing device coordinate system $x_c$, the following is used.

$$R_{wc}^{i}, R_{wc}^{a}, R_{wo}^{i}, R_{wo}^{a} \tag{78}$$

Also, the position $t_{co}$ of the moving object in the image capturing device coordinate system is used. Thus, the transformation can be expressed as Expression (38).

$$x_c = (R_{wc}^{i})^{-1} \cdot (R_{wc}^{a})^{-1} \cdot R_{wo}^{a} \cdot R_{wo}^{i} \cdot x_o + t_{co} \tag{79}$$

Expression (38)

$$(R_{wc}^{a})^{-1} \cdot R_{wo}^{a} \tag{80}$$

The above (80) expresses the azimuth, and the following is obtained.

$$R_a = (R_{wc}^{a})^{-1} \cdot R_{wo}^{a} \tag{81}$$

The above (81) is obtained as the result of combination. Here, the following (82) is expressed as Expression (39).

$$(R_{wc}^{i})^{-1} \tag{82}$$

$R_a$ is expressed as Expression (40). θ denotes the azimuth. Then, the following are assigned.

$$(R_{wc}^{i})^{-1} = \begin{bmatrix} r_{11} & r_{12} & r_{13} \\ r_{21} & r_{22} & r_{23} \\ r_{31} & r_{32} & r_{33} \end{bmatrix} \tag{83}$$

Expression (39)

$$R_a = \begin{bmatrix} \cos\theta & 0 & \sin\theta \\ 0 & 1 & 0 \\ -\sin\theta & 0 & \cos\theta \end{bmatrix} \tag{84}$$

Expression (40)

$$X_o' = [x_o' \quad y_o' \quad z_o']^t = R_{wo}^{i} \cdot X_o \tag{85}$$

At that time, when focal distance is set as f, α=cos θ, β=sin θ, $x_c=[x_c y_c z_c]^t$, and $t_{co}=[t_{ox} t_{oy} t_{oz}]^t$, a projected position ($u_x$, $u_y$) on the captured image of the index whose moving object coordinate is $x_o=[x_o y_o z_o]^t$ is expressed as Expression (41).

Expression (41)

$$u_x = -f\frac{x_c}{z_c} = -f\frac{(r_{11}x_o' + r_{13}z_o')\alpha + (r_{11}z_o' - r_{13}x_o')\beta + t_{ox} + r_{12}y_o'}{(r_{31}x_o' + r_{33}z_o')\alpha + (r_{31}z_o' - r_{33}x_o')\beta + t_{oz} + r_{32}y_o'}$$

$$u_y = -f\frac{y_c}{z_c} = -f\frac{(r_{21}x_o' + r_{23}z_o')\alpha + (r_{21}z_o' - r_{23}x_o')\beta + t_{oy} + r_{22}y_o'}{(r_{31}x_o' + r_{33}z_o')\alpha + (r_{31}z_o' - r_{33}x_o')\beta + t_{oz} + r_{32}y_o'} \tag{86}$$

Next, a description will be given of a method of calculating the position and the orientation of the moving object with respect to the image capturing device, in which the indices detected on the captured image captured by the image capturing device and the inclination components of the orientations output by the gyro sensors are used. FIG. 9 is a flowchart for a method according to the third embodiment.

Firstly, in Step S3010, the index detecting section 310 inputs an image from the image capturing device. Then, at the same time as the image capturing, the orientation inputting section 320 inputs the measured value $R_{wo}$ of the gyro sensor mounted to the moving object and the measured value $R_{wc}$ of the gyro sensor mounted to the image capturing device and respectively decomposes the measured values into the inclination components denoted as follows.

$$R_{wo}^i, R_{wc}^i \quad (87)$$

The measured values are also decomposed into the azimuth components denoted as follows.

$$R_{wo}^a, R_{wc}^a \quad (88)$$

When the decomposition is performed, known procedures are employed. Then, $r_{11}, r_{12}, r_{13}, r_{21}, r_{22}, r_{23}, r_{31}, r_{32}$, and $r_{33}$, which are already known, are obtained from Expression (39) and output to the position and orientation calculating section 330. Subsequently, in Step S3020, the index detecting section 310 detects indices on the moving object from the captured image to output the detected indices to the position and orientation calculating section 330. Herein, the number of indices detected in the captured image is set as n, and the detected positions on the captured image of the detected indices i (i=1, 2, ..., n) are set as follows.

$$(u_{x_i}, u_{y_i}) \quad (89)$$

Next, in Step S3030, the position and orientation calculating section 330 judges whether or not all the detected indices are on a co-horizontal plane. The judgment as to whether or not all the detected indices are on the co-horizontal plane is conducted, for example, in the following manner. Positions of the detected indices i (i=1, 2, ..., n) in the in the moving object coordinate system are expressed as follows.

$$x_{o_i} = [x_{o_i}, y_{o_i}, z_{o_i}]^t, x'_{o_i} = [x'_{o_i}, y'_{o_i}, z'_{o_i}]^t = R_{wo}^i \cdot x_{o_i} \quad (90)$$

Then, from Expression (42), the variance $\sigma^2$ of $y_w$ coordinates of the detected indices is obtained.

Expression (42)

$$\sigma^2 = \frac{\sum_{i=1}^{n}(y'_{o_i} - \bar{y}_w)^2}{n} \quad (91)$$

In Expression (42), an average value of the $y_w$ coordinates of the indices is denoted as follows.

$$\bar{y}_w \quad (92)$$

The average value is obtained from Expression (43)

Expression (43)

$$\bar{y}_w = \frac{\sum_{i=1}^{n} y'_{o_i}}{n} \quad (93)$$

When the variance $\sigma^2$ is lower than a predetermined value, it is judged that all the detected indices are on the horizontal co-plane. In Step S3030, when it is judged that the detected indices are on the horizontal co-plane, the flow advances to Step S3050, and when it is judged that the detected indices are not on the horizontal co-plane, the flow advances to Step S3040.

In Step S3040, the position and orientation calculating section 330 conducts judgment as to whether or not the number of the detected indices is three or higher. In Step S3040, when it is judged that the number of the detected indices is three or higher, the flow advances to Step S3060, and when it is judged that the number of the detected indices is lower than three, the flow ends. Whereas, in Step S3050, judgment is conducted as to whether or not the number of the detected indices is two or higher. In Step S3050, when it is judged that the number of the detected indices is two or higher, the flow advances to Step S3070, and when it is judged that the number of the detected indices is lower than two, the flow ends.

In Step S3060, the position and orientation calculating section 330 employs a procedure (3A) to calculate and output the position and the orientation of the image capturing device with respect to the moving object. Now, the procedure (3A) is described. First of all, Expression (41) is simplified through division processes on the denominator and the numerator of the fraction, and the following are assigned to obtain $\alpha$, $\beta$, $t_{ox}$, $t_{oy}$, and $t_{oz}$.

$$u'_{x_i} = -u_{x_i}/f, u'_{y_i} = -u_{y_i}/f \quad (94)$$

A linear equation for $\alpha$, $\beta$, $t_{ox}$, $t_{oy}$, and $t_{oz}$ thus obtained is established for each of the detected indices, thereby making it possible to obtain simultaneous equations shown in Expression (44).

Expression (44)

$$\begin{bmatrix} u'_{x_i} & (r_{31}x'_{o_i} + r_{33}z'_{o_i}) - r_{11}x'_{o_i} - r_{13}z'_{o_i} & u'_{x_1}(r_{31}z'_{o_i} - r_{33}x'_{o_i}) - r_{11}z'_{o_i} + r_{13}x'_{o_i} & -1 & 0 & u'_{x_i} \\ u'_{y_i} & (r_{31}x'_{o_i} + r_{33}z'_{o_i}) - r_{21}x'_{o_i} - r_{23}z'_{o_i} & u'_{y_1}(r_{31}z'_{o_i} - r_{33}x'_{o_i}) - r_{21}z'_{o_i} + r_{23}x'_{o_i} & 0 & -1 & u'_{y_i} \\ & & \vdots & & & \\ u'_{x_n} & (r_{31}x'_{o_n} + r_{33}z'_{o_n}) - r_{11}x'_{o_n} - r_{13}z'_{o_n} & u'_{x_1}(r_{31}z'_{o_n} - r_{33}x'_{o_n}) - r_{11}z'_{o_n} + r_{13}x'_{o_n} & -1 & 0 & u'_{x_n} \\ u'_{y_n} & (r_{31}x'_{o_n} + r_{33}z'_{o_n}) - r_{21}x'_{o_n} - r_{23}z'_{o_n} & u'_{y_n}(r_{31}z'_{o_n} - r_{33}x'_{o_n}) - r_{21}z'_{o_n} + r_{23}x'_{o_n} & 0 & -1 & u'_{y_n} \end{bmatrix} \quad (95)$$

$$\begin{bmatrix} \alpha \\ \beta \\ t_{ox} \\ t_{oy} \\ t_{oz} \end{bmatrix} = \begin{bmatrix} -u'_{x_i} & r_{32}y'_{o_i} + r_{12}y'_{o_i} \\ -u'_{y_i} & r_{32}y'_{o_i} + r_{22}y'_{o_i} \\ \vdots & \\ -u'_{x_n} & r_{32}y'_{o_n} + r_{12}y'_{o_n} \\ -u'_{y_n} & r_{32}y'_{o_n} + r_{22}y'_{o_n} \end{bmatrix}$$

By solving Expression (44), α, β, $t_{ox}$, $t_{oy}$, and $t_{oz}$ are then obtained. In these simultaneous equations, the number of unknown numbers is five, and therefore at least three detected indices are necessary. From α and β, Expression (13) is used to calculate the azimuth θ. The orientation $R_{co}$ of the moving object with respect to the image capturing device is calculated through Expression (45).

Expression (45)

$$R_{co} = (R^i_{wc})^{-1} \cdot R_a \cdot R^i_{wo} \quad (96)$$
$$= (R^i_{wc})^{-1} \cdot \begin{bmatrix} \cos\theta & 0 & \sin\theta \\ 0 & 1 & 0 \\ -\sin\theta & 0 & \cos\theta \end{bmatrix} \cdot R^i_{wo}$$

With the above-described method, in Step S3060, the position and the orientation of the moving object with respect to the image capturing device are calculated and output.

In Step S3070, the position and orientation calculating section 330 employs a procedure (3B) to calculate and output the position and the orientation of the moving object with respect to the image capturing device. Now, the procedure (3B) is described.

The $y_w$ coordinate of the index in the world coordinate system is set as $y_{avg}$. In Expression (41), the following is set.

$$y'_o = 0 \quad (97)$$

Also, the following are assigned.

$$\alpha' = \alpha/t_{oz}, \beta' = \beta/t_{oz}, t'_{ox} = t_{ox}/t_{oz}, t'_{oy} = t_{oy}/t_{oz} \quad (98)$$

The simplification of the fraction is performed through division processes on the denominator and the numerator. Then, the following are assigned to obtain α', β', $t'_{ox}$, and $t'_{oy}$.

$$u'_{x_i} = -u_x/f, u'_{y_i} = -u_y/f \quad (99)$$

A linear equation for α', β', $t'_{ox}$, and $t'_{oy}$ thus obtained is established for each of the detected indices, and thus simultaneous equations shown in Expression (46) can be obtained.

With the above-described method, in Step S3070, the position and the orientation of the moving object with respect to the image capturing device are calculated and output.

As described above, in this embodiment, when the gyro sensors are mounted to both the moving object and the image capturing device, the position and the orientation of the moving object with respect to the image capturing device (that is, relative position and relative orientation between the image capturing device and the moving object) can be obtained directly from inclination components of the measured values of the sensors and the image information from the image capturing device without the necessity of performing the iterative calculation.

According to this embodiment, after the gyro sensors are mounted to both the image capturing device and the moving object, by using the image of the moving object captured by the image capturing device and only the inclination components of the measured orientation values output from the gyro sensors, without performing the iterative calculation (in other words, without using the initial value), the relative position and relative orientation between the image capturing device and the moving object can be obtained directly. As a result, it is possible to avoid the degradation in accuracy of calculating the position and the orientation, which is attributed to the initial value, generated when the iterative calculation is performed. In fact, when the indices are captured on the captured image, the position and the orientation can be calculated with a high degree of accuracy.

Modified Example 1

In the embodiments described above, the gyro sensor is used as an orientation sensor but the gyro sensor is not limited to the orientation sensor. Any inclination sensor may be used as long as the inclination sensor can measure the inclination component of the orientation. Also, the inclination is not limited to an inclination with respect to the vertical axis. Even when the inclination corresponds to the angle with respect to Expression (46)

$$\begin{bmatrix} u'_{x_i} & (r_{31}x'_{o_i} + r_{33}z'_{o_i}) - r_{11}x'_{o_i} - r_{13}z'_{o_i} & u'_{x_1}(r_{31}z'_{o_i} - r_{33}x'_{o_i}) - r_{11}z'_{o_i} + r_{13}x'_{o_i} & -1 & 0 \\ u'_{y_i} & (r_{31}x'_{o_i} + r_{33}z'_{o_i}) - r_{21}x'_{o_i} - r_{23}z'_{o_i} & u'_{y_1}(r_{31}z'_{o_i} - r_{33}x'_{o_i}) - r_{21}z'_{o_i} + r_{23}x'_{o_i} & 0 & -1 \\ & & \vdots & & \\ u'_{x_n} & (r_{31}x'_{o_n} + r_{33}z'_{o_n}) - r_{11}x'_{o_n} - r_{13}z'_{o_n} & u'_{x_1}(r_{31}z'_{o_n} - r_{33}x'_{o_n}) - r_{11}z'_{o_n} + r_{13}x'_{o_n} & -1 & 0 \\ u'_{y_n} & (r_{31}x'_{o_n} + r_{33}z'_{o_n}) - r_{21}x'_{o_n} - r_{23}z'_{o_n} & u'_{y_n}(r_{31}z'_{o_n} - r_{33}x'_{o_n}) - r_{21}z'_{o_n} + r_{23}x'_{o_n} & 0 & -1 \end{bmatrix} \quad (100)$$

$$\begin{bmatrix} \alpha \\ \beta \\ t'_{ox} \\ t'_{oy} \end{bmatrix} = \begin{bmatrix} -u'_{x_i} \\ -u'_{y_i} \\ \vdots \\ -u'_{x_n} \\ -u'_{y_n} \end{bmatrix}$$

In these simultaneous equations, the number of unknown numbers is four, and therefore at least two detected indices are required. From α' and β' obtained by solving Expression (46), the azimuth θ is calculated through Expression (18). The orientation $R_{co}$ of the moving object with respect to the image capturing device is calculated through Expression (45). Then, $t_{co} = [t_{ox} t_{oy} t_{oz}]^t$ is calculated through Expression (32).

an arbitrary axis, any inclination sensor may be used as long as the inclination sensor can measure the inclination with respect to the arbitrary axis.

Modified Example 2

In the embodiments described above, on the basis of the image coordinates of the indices on the captured image, the three dimensional positions of the indices, and the inclination component of the orientation obtained from the orientation sensor, without performing the iterative calculation, the position and the orientation of the image capturing device (the first embodiment), the position and the orientation of the moving object (the second embodiment), and the relative position and relative orientation between the image capturing device and the moving object (the third embodiment) are obtained. By setting the positions and the orientations thus obtained as the initial values, the positions and the orientations may be optimized through another method.

For example, by employing the procedure disclosed in the above-mentioned paper (Kato, M. Billinghurst, Asano, and Tachibana: "An Augmented Reality System and its Calibration based on Marker Tracking", Journal of The Virtual Reality Society of Japan, Vol. 4, No. 4, pp. 607-616, (December 1999), on the basis of the image coordinates and three dimensional positions of the indices, all of the positions and the orientations of six degree of freedom may be optimized.

In addition, it is also possible to use the procedure disclosed in the above-mentioned paper (K. Satoh, S. Uchiyama, and H. Yamamoto: "A head tracking method using bird's-eye view camera and gyroscope," Proc. 3rd IEEE/ACM Int'l Symp. on Mixed and Augmented Reality (ISMAR 2004), pp. 202-211, 2004) to optimize the positions and the azimuth components of the orientations on the basis of the image coordinates and the three dimensional positions of the indices and the measured value of the orientation sensor.

At that time, it does not matter whether the iterative calculations are performed or not. When the results obtained through the methods described in the first to third embodiments are set as initial values used for an optimization involving the iterative calculation, it is possible to suppress the degradation in accuracy of calculating the position and the orientation due to the improper values (for example, when the position and the orientation cannot be obtained in the previous frame).

To elaborate, the initial value can be obtained independently for each frame, and therefore even when an improper processing result is caused in the previous frame, the appropriate position and orientation can be obtained without the influence of the improper result.

Modified Example 3

In the embodiments described above, the relative position and relative orientation between the image capturing device and the moving object are obtained through matrix calculation. However, the gist of the above-described embodiments resides in directly solving the simultaneous equations without performing the iterative calculation. Therefore, other methods of solving the simultaneous equations such as ICCG (Incomplete Cholesky Conjugate Gradients) may be employed.

Modified Example 4

Furthermore, in the embodiments described above, as expressed as Expression (10), all the detected indices are assumed to have the same degree of reliability for solving the simultaneous equations. However, the simultaneous equations may be solved by changing the degree of reliability for each of the detected indices to impart weight.

Modified Example 5

Moreover, in the embodiments described above, the calculation procedures are switched by judging whether or not the indices are on the co-horizontal plane. However, when it is previously known whether or not the indices are on the co-horizontal plane, the judgment step is skipped and Expression (10) or Expression (17) (alternatively, Expression (28) or Expression (31), or Expression (44) or Expression (46)) may be solved directly.

Modified Example 6

In the embodiments described above, on the basis of the image coordinates of the indices on the captured image, the three dimensional positions of the indices, and the inclination component of the orientation obtained from the orientation sensor, without performing iterative calculation, the position and the azimuth of the image capturing device (the first embodiment), the position and the azimuth of the moving object (the second embodiment), and the relative position and the azimuth between the image capturing device and the object (the third embodiment) are obtained. However, when the inclination component of the orientation obtained from the orientation sensor is accurate enough and the azimuth component of the orientation obtained from the orientation sensor has relatively small errors, the position and the azimuth error is calculated.

When a rotation angle $\theta$ is very small, the rotation matrix $R(\theta)$ which represents the rotation around the y-axis is expressed as follows by using the linear approximation.

$$R(\theta) = \begin{bmatrix} 1 & 0 & \theta \\ 0 & 1 & 0 \\ -\theta & 0 & 1 \end{bmatrix} \quad (101)$$

In this modified example, it is assumed that the azimuth error of the orientation obtained from the orientation sensor is small enough and its rotation matrix can be linearly approximated with Expression (101). The relationship between true rotation matrix $R_{TRUE}$ and the rotation matrix $R_{SENSOR}$ which represents the output of the orientation sensor is expressed as follows.

$$R_{TRUE} = R_{ERROR}^{-1} \cdot R_{SENSOR} \quad (102)$$

Here, the rotation matrix $R_{ERROR}$ represents the azimuth error of the orientation obtained from the orientation sensor. $R_{SENSOR}$ is expressed as $R_{SENSOR} = R_{CORRECT} \cdot R_{MEASURED}$. $R_{MEASURED}$ represents a rotation matrix of the raw output of the sensor. $R_{CORRECT}$ represents a rotation matrix which corrects the raw orientation of the sensor. $R_{CORRECT}$ is initially set by hand or set to identity matrix and updated by using the latest $R_{ERROR}$.

In the same case as the first embodiment, where the orientation sensor is fixed to an image capturing device and the position and the orientation of the image capturing device are obtained, the coordinate transform between the world coordinate system $x_w$ and the camera coordinate system $x_c$ is expressed by using the following equation.

$$x_w = R_{ERROR}^{-1} \cdot R_{SENSOR} \cdot x_c + t_{wc} \quad (103)$$

Expression (103) can be rewritten in the following form.

$$x_c = R_{SENSOR}^{-1} \cdot R_{ERROR} \cdot x_w + t_{cw} \quad (104)$$

Here, $t_{cw}$ ($=[t_x t_y t_z]^t$) means the translation between both coordinate systems. When azimuth error is denoted by $\theta$, $R_{ERROR}$ can be expressed as Expression (101). The above $R_{SENSOR}^{-1}$ is expressed as Expression (105).

$$R_{SENSOR}^{-1} = \begin{bmatrix} r_{11} & r_{12} & r_{13} \\ r_{21} & r_{22} & r_{23} \\ r_{31} & r_{32} & r_{33} \end{bmatrix} \quad (105)$$

The projected position ($u_x$, $u_y$) of an index the position of which is $x_w = [x_w y_w z_w]^t$ is expressed as Expression (106).

$$u_x = -f\frac{x_c}{z_c} \quad (106)$$
$$= -f\frac{(r_{11}z_w - r_{13}x_w)\theta + t_x + r_{11}x_w + r_{12}y_w + r_{13}z_w}{(r_{31}z_w - r_{33}x_w)\theta + t_z + r_{31}x_w + r_{32}y_w + r_{33}z_w}$$

$$u_y = -f\frac{y_c}{z_c}$$
$$= -f\frac{(r_{21}z_w - r_{23}x_w)\theta + t_y + r_{21}x_w + r_{22}y_w + r_{23}z_w}{(r_{31}z_w - r_{33}x_w)\theta + t_z + r_{31}x_w + r_{32}y_w + r_{33}z_w}$$

By assigning $u'_x = -u_x/f$, $u'_y = -u_y/f$, linear equations for $\theta$, $t_x$, $t_y$ and $t_z$ are obtained as follows.

$$\begin{bmatrix} u'_x(r_{31}z_w - r_{33}x_w) - r_{11}z_w + r_{13}x_w & -1 & 0 & u'_x \\ u'_y(r_{31}z_w - r_{33}x_w) - r_{21}z_w + r_{23}x_w & 0 & -1 & u'_y \end{bmatrix} \quad (107)$$

$$\begin{bmatrix} \theta \\ t_x \\ t_y \\ t_z \end{bmatrix} = \begin{bmatrix} r_{11}x_w + r_{12}y_w + r_{13}z_w - u'_x(r_{31}x_w + r_{32}y_w + r_{33}z_w) \\ r_{21}x_w + r_{22}y_w + r_{23}z_w - u'_y(r_{31}x_w + r_{32}y_w + r_{33}z_w) \end{bmatrix}$$

Linear equations expressed as Expression (107) are obtained for each of the detected indices. Therefore, by solving simultaneous equations consisting of Expression (107) in the same way as described above embodiments, the azimuth error $\theta$ and the translation $t_{cw}$ are obtained. Since the number of unknown parameters is four, at least two indices are necessary for calculation. The different point from the first embodiment is that judging if the indices are horizontally coplanar is not necessary in this modified example.

In the same case as the second embodiment, the similar method can be applied. When the rotation matrix which represents the rotation of an object to the world coordinate system is expressed in the form of Expression (102), the coordinate transform between the object coordinate system and the camera coordinate system can be written as follows.

$$x_c = R_{wc}^{-1} \cdot R_{ERROR}^{-1} \cdot R_{SENSOR} \cdot x_o + t_{co}$$

By expressing $R_{SENSOR} \cdot x_o$ as $x'_o$, the projected position ($u_x$, $u_y$) of an index the position of which is $x'_o = [x'_o y'_o z'_o]$ is expressed as Expression (108).

$$u_x = -f\frac{x_c}{z_c} \quad (108)$$
$$= -f\frac{(R_{13}x_w - R_{11}z_w)\theta + t_{ox} + R_{11}x_w + R_{12}y_w + R_{13}z_w}{(R_{33}x_w - R_{31}x_w)\theta + t_{oz} + R_{31}x_w + R_{32}y_w + R_{33}z_w}$$

$$u_y = -f\frac{y_c}{z_c}$$
$$= -f\frac{(R_{23}x_w - R_{21}z_w)\theta + t_{oy} + R_{21}x_w + R_{22}y_w + R_{23}z_w}{(R_{33}x_w - R_{31}x_w)\theta + t_{oz} + R_{31}x_w + R_{32}y_w + R_{33}z_w}$$

From the Expression (108), linear equations expressed as Expression (109) are obtained.

$$\begin{bmatrix} u'_x(R_{33}x_w - R_{3z}z_w) + R_{11}z_w - R_{13}x_w & -1 & 0 & u'_x \\ u'_y(R_{33}x_w - R_{3z}x_w) + R_{21}z_w - R_{23}x_w & 0 & -1 & u'_y \end{bmatrix} \quad (109)$$

$$\begin{bmatrix} \theta \\ t_{ox} \\ t_{oy} \\ t_{oz} \end{bmatrix} = \begin{bmatrix} R_{11}x_w + R_{12}y_w + R_{13}z_w - u'_x(R_{31}x_w + R_{32}y_w + R_{33}z_w) \\ R_{21}x_w + R_{22}y_w + R_{23}z_w - u'_y(R_{31}x_w + R_{32}y_w + R_{33}z_w) \end{bmatrix}$$

By solving simultaneous equations formulated using Expression (109) for each detected vertices, the azimuth error and the translation can be obtained in this case.

$R_{CORRECT}$ is updated by using the obtained azimuth error $\theta$ as $R_{CORRECT} \leftarrow R_{ERROR}^{-1} \cdot R_{CORRECT}$. $R_{ERROR}^{-1}$ is the inverse matrix of a matrix calculated from Expression (101).

In the case same as the third embodiment, the similar method can be applied by using decomposition expressed as Expression (102). The detailed way is easily obtained by referring the third embodiment and the description in this modified example.

As described above, in this modified example, the azimuth error of the orientation obtained from the orientation sensor and the position are obtained instead of the azimuth component and the position when the azimuth error is small enough.

Other Embodiments

In addition, the following case is in the scope of the present invention. A computer installed in a device or a system connected to various devices for realizing the functions of the embodiments described above and for operating the various devices is supplied with a software program code for realizing the functions of the embodiments described above, and the computer (CPU or MPU) of the system or the device is embodied by operating the various devices in accordance with the program stored.

In this case, the program code of the software itself achieves the functions of the embodiments described above, and therefore the program code itself and a unit for supplying the program code to the computer, for example, a recording medium storing the program code, provides the present invention.

For example, a floppy disk, a hard disk, an optical disk, a magnetic optical disk, a CD-ROM, a magnetic tape, a non-volatile memory card, or a ROM can be used as the recording medium storing the program code.

Of course the program code encompasses the embodiments of the present invention not only in the case where the supplied program code is executed by the computer to realize the functions of the embodiments described above, but also in the case where the program code functions in association with an operating system (OS) running on the computer or another application software or the like to realize the functions of the embodiments described above.

Alternatively, the supplied program code can be stored in a function extension board of the computer or in a memory of a function extension unit connected to the computer. In this case a CPU or the like of the function extension board or the function extension unit executes the entirety or a part of the actual processing in accordance with instructions in the program code, to realize the functions of the embodiments described above through the processing.

It is to be understood that the invention is not limited to the specific embodiments described above, but is defined by the following claims, which should be taken to encompass all alternative and equivalent means for providing the functions specified.

This application claims the priority of Japanese Application No. 2005-109834 filed Apr. 6, 2005, which is hereby incorporated by reference herein in its entirety.

What is claimed is:

1. A position and orientation measuring method, comprising the steps of:
   inputting a measured inclination value of an inclination sensor mounted to at least one of an object and an image capturing device;
   inputting a captured image from the image capturing device;
   detecting a plurality of indices on the object from the captured image;
   calculating a variance of respective coordinates in an axis of the detected plurality of indices;
   determining whether the detected plurality of indices are placed on an identical horizontal plane by comparing the calculated variance with a predetermined value;
   selecting a position and orientation calculating procedure from among a plurality of position and orientation calculating procedures, based on a result of the determination; and
   calculating a position and an orientation of one of the object and the image capturing device to which the inclination sensor is mounted based on the measured inclination value, an image coordinate of the detected indices, and known positional information on the detected indices without performing an iterative calculation of correction values of position and orientation, based on the selected position and orientation calculating procedure.

2. The position and orientation measuring method according to claim 1, wherein the calculating step calculates the position and the orientation on the basis of at least three detected indices.

3. The position and orientation measuring method according to claim 1, wherein the calculating step solves simultaneous equations obtained by establishing a linear equation for each of the detected indices.

4. The position and orientation measuring method according to claim 1, further comprising the step of optimizing the position and the orientation on the basis of an image coordinate of the detected indices and the known positional information on the detected indices while the calculated position and the calculated orientation are set as initial values.

5. The position and orientation measuring method according to claim 4, wherein the step of optimizing the position and the orientation includes the step of using iterative calculation.

6. A position and orientation measuring method, comprising the steps of:
   inputting a first measured inclination value of a first inclination sensor mounted to an object;
   inputting a second measured inclination value of a second inclination sensor mounted to an image capturing device;
   inputting a captured image from the image capturing device;
   detecting a plurality of indices on the object from the captured image;
   calculating a variance of respective coordinates in an axis of the detected plurality of indices;
   determining whether the detected plurality of indices are placed on an identical horizontal plane by comparing the calculated variance with a predetermined value;
   selecting a position and orientation calculating procedure from among a plurality of position and orientation calculating procedures, based on a result of the determination; and
   calculating relative position and relative orientation of the object and the image capturing device based on the first measured inclination value, the second measured inclination value, an image coordinate of the detected indices, and known positional information on the detected indices without performing an iterative calculation of correction values of position and orientation, based on the selected position and orientation calculating procedure.

7. The position and orientation measuring method according to claim 6, wherein the calculating step calculates the relative position and the relative orientation on the basis of at least three detected indices.

8. The position and orientation measuring method according to claim 6, wherein the calculating step solves simultaneous equations obtained by establishing a linear equation for each of the detected indices.

9. The position and orientation measuring method according to claim 6, further comprising the step of optimizing the relative position and the relative orientation on the basis of an image coordinate of the detected indices and the known positional information on the detected indices while the calculated relative position and the calculated relative orientation are set as initial values.

10. The position and orientation measuring method according to claim 9, wherein the optimizing step uses iterative calculation.

11. A position and orientation measuring apparatus, comprising:
    an image capturing device;
    an inclination sensor mounted to at least one of an object and the image capturing device;
    an inclination value input unit adapted to input a measured inclination value of the inclination sensor;
    an image inputting unit adapted to input a captured image from the image capturing device;
    an index detecting unit adapted to detect a plurality of indices on the object from the captured image; and
    a position and orientation calculator adapted to calculate a variance of respective coordinates in an axis of the detected plurality of indices, determine whether the detected plurality of indices are placed on an identical horizontal plane by comparing the calculated variance with a predetermined value, to select a position and orientation calculating procedure from among a plurality of position and orientation calculating procedures based on a result of the determination and to calculate a position and an orientation of one of the object and the image capturing device to which the inclination sensor is mounted based on the measured inclination value, an image coordinate of the detected indices, and known positional information on the detected indices without performing iterative calculation of correction values of position and orientation, based on the selected position and orientation calculating procedure.

12. A position and orientation measuring apparatus, comprising:
    a first measured inclination value input unit adapted to input a first measured inclination value of a first inclination sensor mounted to an object;

a second measured inclination value input unit adapted to input a second measured inclination value of a second inclination sensor mounted to an image capturing device;

an image inputting unit adapted to input a captured image from the image capturing device;

an index detecting unit adapted to detect a plurality of indices on the object from the captured image; and a position and orientation calculator adapted to calculate a variance of respective coordinates in an axis of the detected plurality of indices, determine whether the detected plurality of indices are placed on an identical horizontal plane by comparing the calculated variance with a predetermined value, to select a position and orientation calculating procedure from among a plurality of position and orientation calculating procedures based on a result of the determination, and to calculate relative position and relative orientation of the object and the image capturing device based on the first measured inclination value, the second measured inclination value, an image coordinate of the detected indices, and known positional information on the detected indices without performing iterative calculation of correction values of position and orientation, based on the selected position and orientation calculating procedure.

13. A non-transitory computer-readable medium having stored thereon a program which, when loaded into a computer and executed performs a position and orientation measuring method according to claim 1.

14. A non-transitory computer-readable medium having stored thereon a program which, when loaded into a computer and executed performs a position and orientation measuring method according to claim 6.

* * * * *